United States Patent
Yoda

(10) Patent No.: US 11,514,320 B2
(45) Date of Patent: Nov. 29, 2022

(54) ARITHMETIC PROCESSING APPARATUS, CONTROL METHOD, AND NON-TRANSITORY COMPUTER-READABLE RECORDING MEDIUM HAVING STORED THEREIN CONTROL PROGRAM

(71) Applicant: FUJITSU LIMITED, Kawasaki (JP)

(72) Inventor: Katsuhiro Yoda, Kodaira (JP)

(73) Assignee: FUJITSU LIMITED, Kawasaki (JP)

( * ) Notice: Subject to any disclaimer, the term of this patent is extended or adjusted under 35 U.S.C. 154(b) by 281 days.

(21) Appl. No.: 16/886,851

(22) Filed: May 29, 2020

(65) Prior Publication Data

US 2020/0387787 A1    Dec. 10, 2020

(30) Foreign Application Priority Data

Jun. 7, 2019    (JP) .............................. JP2019-107081

(51) Int. Cl.
*G06N 3/08*    (2006.01)
*G06F 7/499*    (2006.01)
*G06F 9/30*    (2018.01)

(52) U.S. Cl.
CPC ........... *G06N 3/08* (2013.01); *G06F 7/49942* (2013.01); *G06F 9/3001* (2013.01)

(58) Field of Classification Search
CPC . G06N 3/08; G06N 3/02; G06N 20/00; G06F 9/3001; G06F 7/57
USPC .................. 375/219, 240.02, 240.08; 706/25
See application file for complete search history.

(56) References Cited

U.S. PATENT DOCUMENTS

| | | | |
|---|---|---|---|
| 2008/0056616 A1 | 3/2008 | Hasegawa | |
| 2019/0130255 A1* | 5/2019 | Yim | G06N 3/08 |
| 2019/0130268 A1* | 5/2019 | Shiring | G06N 3/0481 |
| 2019/0180177 A1* | 6/2019 | Yim | G06N 3/0481 |
| 2019/0251429 A1* | 8/2019 | Du | G06N 3/0454 |
| 2019/0266473 A1* | 8/2019 | Tomono | G06F 7/49942 |
| 2019/0339939 A1 | 11/2019 | Ito et al. | |
| 2020/0125947 A1* | 4/2020 | Park | G06N 5/04 |
| 2020/0160222 A1* | 5/2020 | Zhang | G06F 7/38 |

(Continued)

FOREIGN PATENT DOCUMENTS

| | | |
|---|---|---|
| EP | 3474132 A1 | 4/2019 |
| JP | H04-190399 A | 7/1992 |
| JP | H07-084975 A | 3/1995 |

(Continued)

OTHER PUBLICATIONS

Koster, Urs et al.,"Flexpoint: An Adaptive Numerical Format for Efficient Training of Deep Neural Networks", CORR(ARXIV), vol. 1711.02213, No. v1, Nov. 6, 2017, pp. 1-14, XP055566223.

(Continued)

*Primary Examiner* — Emmanuel Bayard
(74) *Attorney, Agent, or Firm* — Fujitsu Patent Center

(57) ABSTRACT

An arithmetic processing apparatus includes: a first determiner that determines, when a given learning model is repeatedly learned, an offset amount for correcting a decimal point position of fixed-point number data used in the learning in accordance with a degree of progress of the learning; and a second determiner that determines, based on the offset amount, the decimal point position of the fixed-point number data to be used in the learning. This configuration avoids lowering of the accuracy of a learning result of a learning model.

20 Claims, 27 Drawing Sheets

(56) References Cited

U.S. PATENT DOCUMENTS

2020/0257960 A1\* 8/2020 Gabriel .................... G06N 3/08
2020/0302289 A1\* 9/2020 Ren .......................... G06N 3/04

FOREIGN PATENT DOCUMENTS

| JP | 2008-059287 A | 3/2008 |
| JP | 2018-124681 A | 8/2018 |
| WO | 2018/139266 A1 | 8/2018 |

OTHER PUBLICATIONS

Courbariaux, Matthieu et al.,"Training Deep Neural Networks With Low Precision Multiplications", Accepted as a workshop contribution at ICLR 2015, pp. 1-10, Sep. 23, 2015, XP055670419.
Extended European Search Report dated Oct. 23, 2020 for corresponding European Patent Application No. 20177290.2, 7 pages.

\* cited by examiner

FIG.2

| DATA ID | INPUT DATA | OUTPUT DATA |
|---|---|---|
| 00001 | A1 | B1 |
| 00002 | A2 | B2 |
| ... | ... | ... |
| S | AS | BS |

DATA FOR LEARNING

FIG.5

| ITERATION NUMBER i | PARAMETER $W_1$ | ... | PARAMETER $W_L$ | ... | PARAMETER $W_N$ |
|---|---|---|---|---|---|
| 1 | $W_1(1)$ | ... | $W_L(1)$ | ... | $W_N(1)$ |
| 2 | $W_1(2)$ | ... | $W_L(2)$ | ... | $W_N(2)$ |
| ... | ... | ... | ... | ... | ... |
| M | $W_1(M)$ | ... | $W_L(M)$ | ... | $W_N(M)$ |

FIG.15

| LEARNING RATE $\mu$ | OFFSET |
|---|---|
| 0.1 | 3 |
| 0.01 | 1 |
| 0.001 | 0 |

FIG.23

| THRESHOLD FOR DETECTING | OFFSET |
|---|---|
| TH3 | 2 |
| TH2 | 1 |

US 11,514,320 B2

ARITHMETIC PROCESSING APPARATUS, CONTROL METHOD, AND NON-TRANSITORY COMPUTER-READABLE RECORDING MEDIUM HAVING STORED THEREIN CONTROL PROGRAM

CROSS-REFERENCE TO RELATED APPLICATION

This application is based upon and claims the benefit of priority of the prior Japanese Patent application No. 2019-107081, filed on Jun. 7, 2019, the entire contents of which are incorporated herein by reference.

FIELD

The embodiments discussed herein are directed to an arithmetic processing apparatus, a control process, and a non-transitory computer-readable recording medium having stored therein a control program.

BACKGROUND

In an arithmetic processing apparatus, there is known a method for shifting the decimal position of fixed-point number data on the basis of statistical information on the distribution of bits in the data after being subjected to execution of an instruction directed to the fixed-point number data. This method makes it possible to execute, for example, the calculating process related to deep learning with high accuracy by means of a fixed-point number to thereby reduce the circuit scale and the power consumption.

[Patent Document 1] Japanese Laid-open Patent Publication No. 07-84975

[Patent Document 2] Japanese Laid-open Patent Publication No. 2008-059287

[Patent Document 3] Japanese Laid-open Patent Publication No. 04-190399

[Patent Document 4] Japanese Laid-open Patent Publication No. 2018-124681

SUMMARY

According to an aspect of the embodiments, an arithmetic processing apparatus includes: a memory; and a processor coupled to the memory, the processor being configured to: determine, when a training of a given learning model is repeatedly performed, an offset amount for correcting a decimal point position of fixed-point number data used in the training in accordance with a degree of progress of the training; and determine, based on the offset amount, the decimal point position of the fixed-point number data used in the training.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of data stored in a data storing unit;

FIG. 5 is a diagram illustrating an example of updating information that a parameter storing unit stores;

FIG. 15 is a diagram illustrating an example of information stored in an information storing unit;

FIG. 23 is a diagram illustrating an example of the information stored in an information storing unit;

DESCRIPTION OF EMBODIMENT(S)

Figure 1:
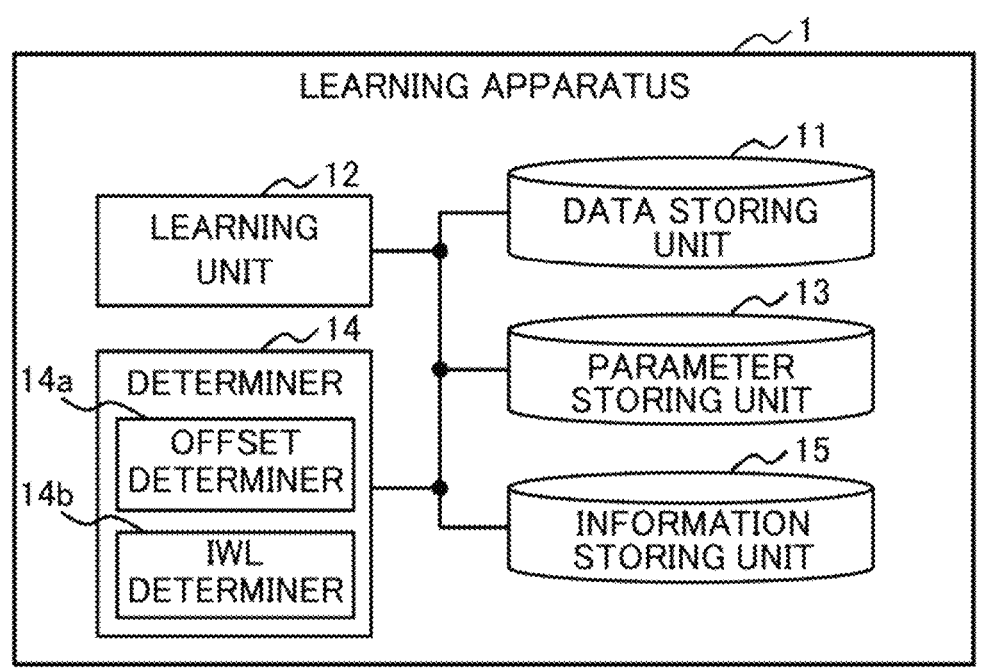
FIG. 1 is a block diagram schematically illustrating an example of the functional configuration of a learning apparatus according to a first embodiment.

When the arithmetic processing apparatus is caused to learn the parameters of learning models such as neural networks, gaps may be generated between a decimal point position estimated on the basis of statistical information of the learning and actual distributions of parameters and output data. The deviation of the gaps is larger at the earlier stage of the learning, for example.

If such gaps are generated, the updating of the decimal point position on the basis of the statistical information may increase a quantization error due to the saturation of the fixed point as compared with the case where the gaps are small, and the learning becomes unstable, in other words, the accuracy of the learning result may be lowered.

Hereinafter, embodiments of the present invention will now be described with reference to the accompanying drawings. However, the embodiments described below are merely illustrative and is not intended to exclude the application of various modifications and techniques not explicitly described below. For example, the present embodiments can be variously modified and implemented without departing from the scope thereof. In the drawings to be used in the following description, the same reference numbers denote the same or similar parts, unless otherwise specified.

[1] First Embodiment

[1-1] Example of Functional Configuration

FIG. 1 is a block diagram schematically illustrating an example of the functional configuration of a learning apparatus 1 as an example of the first embodiment. The learning apparatus 1 is an example of an information processing apparatus including an arithmetic processing device (not illustrated) that performs various calculation operations such as calculation operations related to deep learning. The learning apparatus 1 may learn parameters of a learning model such as a neural network, for example.

As illustrated in FIG. 1, the learning apparatus 1 may illustratively include a data storing unit 11, a learning unit 12, a parameter storing unit 13, a determiner 14, and a data storing unit 15.

The data storing unit 11 stores the data for learning used for training predetermined learning models. As exemplarily illustrated in FIG. 2, the data for learning may be stored in a table format, or may be stored in various formats such as a Database (DB) and an array.

The data for learning may be a combination of input data and correct answer data (training data) corresponding to the input data. Each data can be identified by a data ID indicating identification information. For example, the data storing unit 11 may store an entry in which a data ID "00001", the input data "A1", and the correct answer data "B1" are associated with one another. A non-limiting example of the input data is image data including RGB elements.

Figure 3:
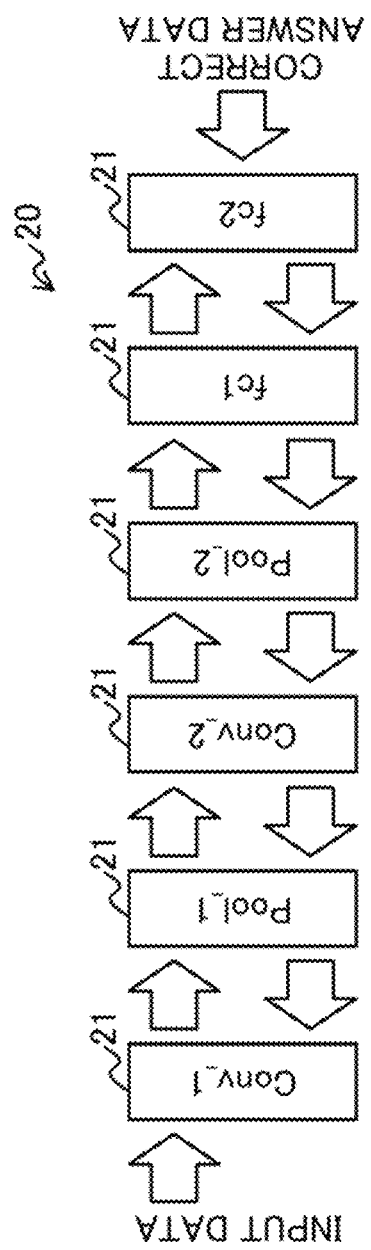
FIG. 3 is a diagram illustrating an example of deep learning on a Convolutional Neural Network (CNN)

The learning apparatus 1 uses the data for learning stored in the data storing unit 11 to train a Deep Neural Network (DNN), for example, a Convolutional Neural Network (CNN) 20, which is an example of a learning model. FIG. 3 is a diagram illustrating examples of deep learning on the CNN 20.

The CNN 20 exemplarily illustrated in FIG. 3 may include layers 21 of Conv_1, Pool_1, Conv_2, Pool_2, fc1, and fc2. As illustrated in FIG. 3, in the deep learning process on the CNN 20, the correct answer data corresponding to the input data is given to the CNN 20. The learning apparatus 1 inputs the input data to the CNN 20 from the left end in the drawing of FIG. 3, and causes the processing results of the respective layers 21 to propagate in the rightward direction in the drawing (forward propagation). Then, the learning apparatus 1 compares the output data and the correct answer data related to the input data, and causes the result difference between the data to propagate in the leftward direction in the drawing (backward propagation).

For example, the convolution calculation on the Conv_1 layer is accomplished by executing a product-sum calculation of the parameters of the Conv_1 on the input data. Each of the layers 21 of Conv_1, Pool_1, Conv_2, Pool_2, fc1, and fc2 retains parameters. When the calculation is accomplished up to the top layer 21 (fc2 illustrated in FIG. 3) of the CNN 20, the calculation result is compared with the correct answer data, and the parameters of each layer 21 are updated on the basis of the comparison result. Updating of parameters in backward propagation on the basis of correct answer data may be referred to as backward propagation processing.

Figure 4:
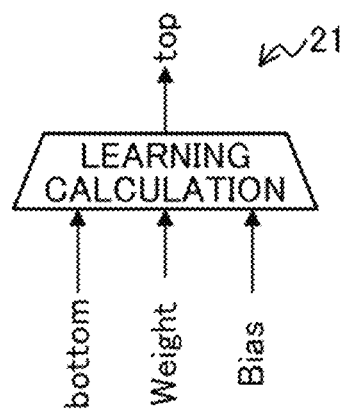
FIG. 4 is a diagram illustrating an example of learning calculation in each layer of the CNN.

In each layer 21 of the CNN 20, a calculation exemplarily illustrated in FIG. 4 is performed. As illustrated in FIG. 4, when the learning calculation is performed, a product-sum calculation on "bottom", which is the input data or the output data from a previous layer 21, and "Weight", which is a parameter, is performed. The output data "top" is output in accordance with the sum of the product-sum calculation result and "Bias".

The process of learning and inferring the CNN 20 may be performed by, for example, a Large Scale Integration (LSI) including a dynamic fixed-point processor.

Here, the learning apparatus 1 repeatedly trains the CNN 20 using the fixed-point number data. A fixed-point number may mean a numerical value expressed by fixing a decimal point position (digit), and the fixed-point number data may mean, for example, variables handled by each layer 21 in training of the CNN 20, or calculation results of each layer 21. The initial position (initial decimal point position) of the fixed-point number may be determined by the learning apparatus 1 on the basis of a learning result (trial result) obtained by training the CNN 20 one or more times using a numerical value of a floating-point number, or may be assigned by a user, for example.

For example, it is assumed that execution of a mini-batch of a learning process once is regarded as one iteration. A mini-batch means that multiple pieces of image data are simultaneously subjected to a learning process. For example, a mini-batch of "16" means that 16 pieces of image data are simultaneously subjected to the learning process. Therefore, for example, when 65536 pieces of image data is present, all the image data are input by 4096 iterations. An iteration means the number of times of execution of mini-batches in deep learning.

The learning unit 12 expresses the data for learning stored in the data storing unit 11 by a fixed-point number, trains the CNN 20 by using a numerical value of the fixed-point number, and obtains the parameter $W_L$ of each layer 21 of the CNN 20 as a learning result. Here, the symbol "L" represents an index for identifying each layer 21 of the CNN 20. The parameter $W_L$ is a parameter vector exemplified by the following equation (1). The subscript "Wn" represents the number of elements in the vector of the parameter $W_L$.

$$W_L = \{W_{0,L}, W_{1,L}, \ldots, W_{Wn,L}\} \quad (1)$$

As illustrated in FIG. 5, the parameter vector of the parameter storing unit 13 is updated each time the learning is repeated and then overwritten.

The determiner 14 determines the decimal point position of the fixed-point number on the basis of statistical information obtained by the learning process on the CNN 20. The decimal point position determined by the determiner 14 is used by the learning unit 12 to train the CNN 20.

The determiner 14 may illustratively include an offset determiner 14a and an Integer Word Length (IWL) determiner 14b.

The information storing unit 15 is an example of a storage device, and stores information related to offsets, which will be described later, used for determining the decimal point position by the determiner 14. Details of the determiner 14 and the information storing unit 15 will be detailed below.

[1-2] Decimal Point Position of Fixed-Point Number

Figure 6:
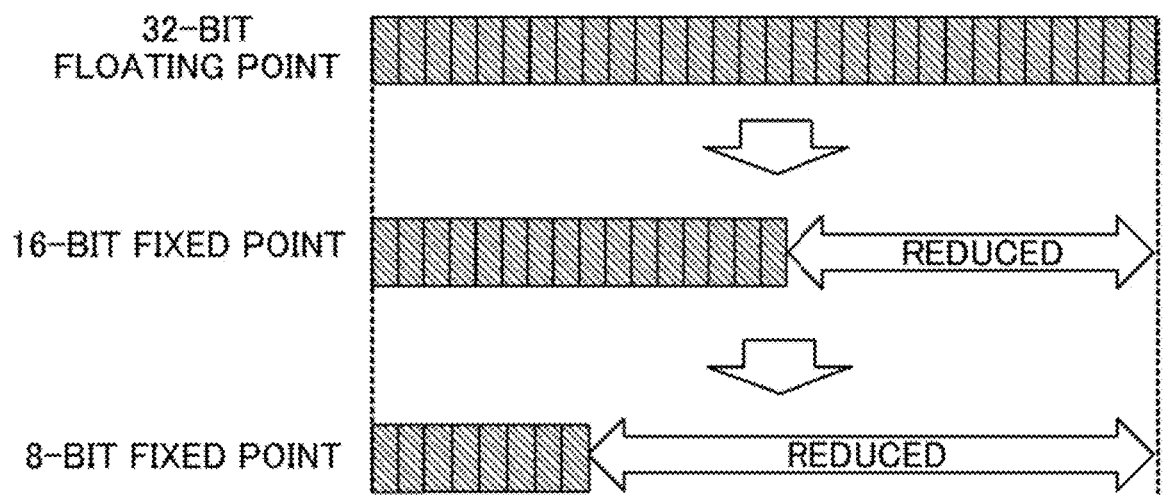
FIG. 6 is a diagram illustrating an example of expressing data of variables in each layer of the CNN.

FIG. 6 is a diagram illustrating an example of expressing data of variables (parameters) in each layer 21 of the CNN 20. When a parameter is learned in deep learning, loads such as a computational load, a memory load, or the like are applied due to a huge computational amount, so that the learning time of the parameters is prolonged.

Here, in the first embodiment, in order to shorten the learning time of the parameters, as described above, the numerical value used in the learning is expressed by a fixed-point number (e.g., 16-bit or 8-bit fixed-point number) instead of a floating-point number (e.g., 32-bit floating-point number).

By expressing a numerical value used in the learning by a fixed-point number, as illustrated in FIG. 6, the amount of data can be reduced, and the load such as the computation load and the memory load can be reduced, so that the learning time of the parameters can be shortened.

However, fixed-point numbers have a narrower range of expressible numeral values than floating-point numbers. For this reason, the learning process by means of the numerical value expressed by the fixed-point number may have low accuracy of the learning result.

Figure 7:
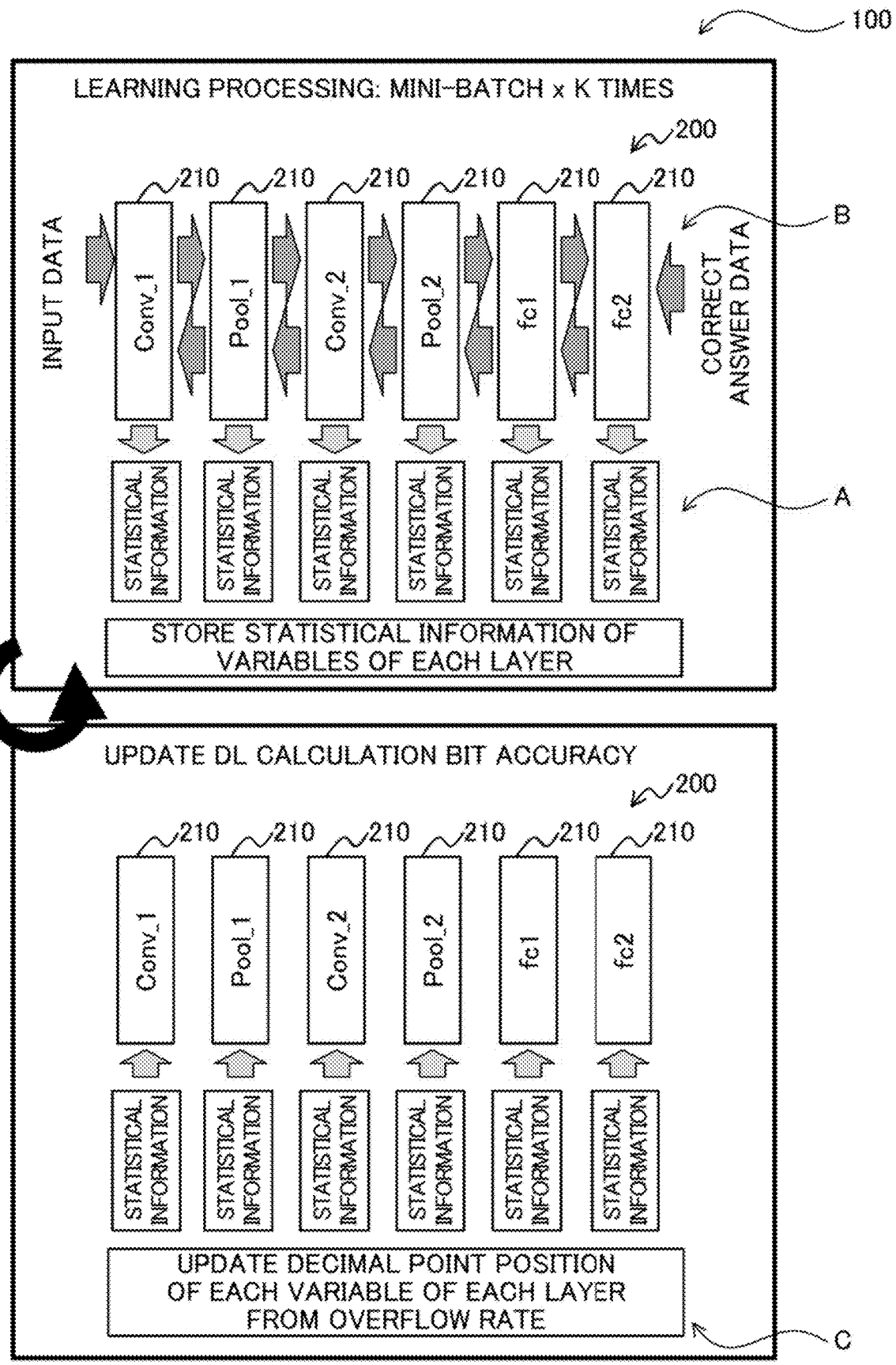
FIG. 7 is a diagram illustrating a process by a learning apparatus according to a comparative example.

As a solution to the above, statistical information is obtained during the learning in the deep learning and the decimal point positions of the variables used for the learning are adjusted. FIG. 7 is a diagram illustrating a process performed by the learning apparatus 100 according to a comparative example. As illustrated in FIG. 7, the learning apparatus 100 executes the following processes (A) to (C) until the learning is completed.

(A) The learning apparatus 100 stores the statistical information of each variable of each layer 210 during learning a mini-batch of a predetermined number of times (for example, K times; K is an integer of 1 or more) (see symbol A in FIG. 7).

Here, the statistical information may include, for example, any of the following or a combination thereof. The application program that the learning apparatus 100 executes optimizes the decimal point position by obtaining statistical information from the processor. Along the process of the application program, the processor executes an instruction for Dynamic Fixed Point calculation.

A distribution of the most significant bit (MSB) positions to be unsigned;
A distribution of the least significant bit (LSB) positions to be non-zero;
The maximum value of the most significant bit position to be unsigned;
The minimum value of the least significant bit position to be non-zero.

As described above, the statistical information can be information on a distribution of the most significant bit positions or a distribution of the least significant bit positions of the multiple pieces of fixed-point number data acquired for each time the learning the mini-batch is repeated.

Figure 8:
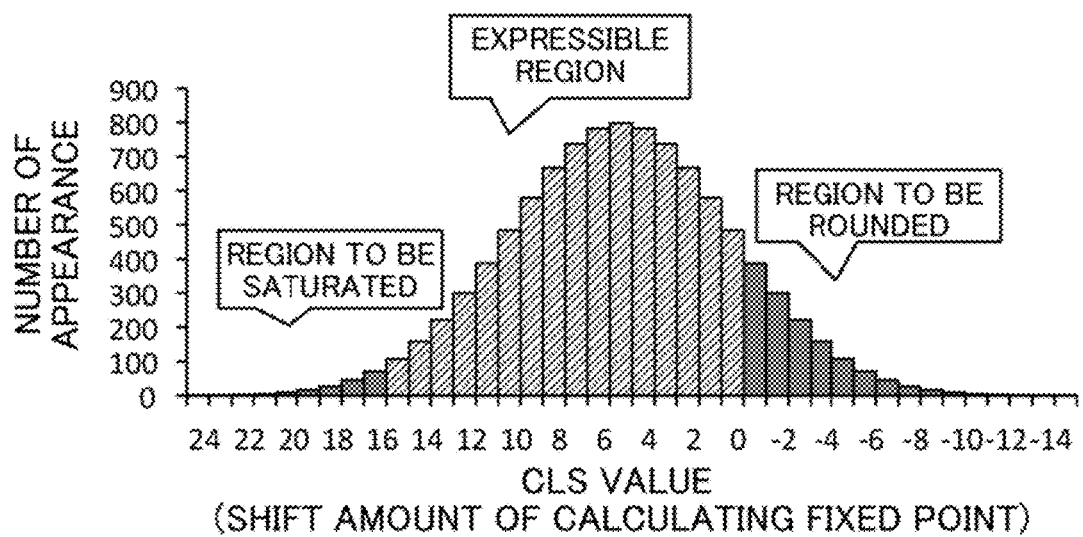
FIG. 8 is a diagram illustrating an example of a histogram representing a distribution of the most significant bits to be unsigned.

FIG. 8 is a diagram illustrating an example of a histogram representing the distribution of the most significant bits to be unsigned. In FIG. 8, the vertical axis represents the number of appearances of the most significant bit positions to be unsigned, and the horizontal axis represents the most significant bit position. In the example of FIG. 8, a decimal point is assumed to be positioned on the right side of the drawing of bit 0. One example of the most significant bit position is the value of a Count Leading Sign (CLS). The CLS may indicate the position of the most significant bit 1 of a positive number (i.e., the position of the most significant bit 0 of a negative number).

The "expressible region" indicates a region of the most significant bit to be unsigned and which is included in a numerical value range of the 16-bit fixed-point number. The "region to be saturated" indicates a region of the most significant bit which exceeds the above numerical value range and in which a saturating process is performed. The saturating process is, for example, a process of clipping a positive maximum value when positive numbers overflow and a negative minimum value when negative numbers underflow. When a bit representing a minute resolution that the expressible region is unable to express appears, a rounding processing is performed.

(B) If an overflow occurs during the learning of the mini-batch in the CNN 200, the learning apparatus 100 performs a saturating process and continues the learning (see symbol B in FIG. 7).

(C) After completion of mini-batches K times, the learning apparatus 100 adjusts the decimal position of the fixed-point number for each variable of each layer 210 on the basis of statistical information (see symbol C in FIG. 7).

For example, the learning apparatus 100 adjusts the decimal point position of a variable of a certain layer 210 on the basis of the statistical information of the same layer 210. The learning apparatus 100 performs such adjustment for each layer 210 and for each variable.

Figure 9:
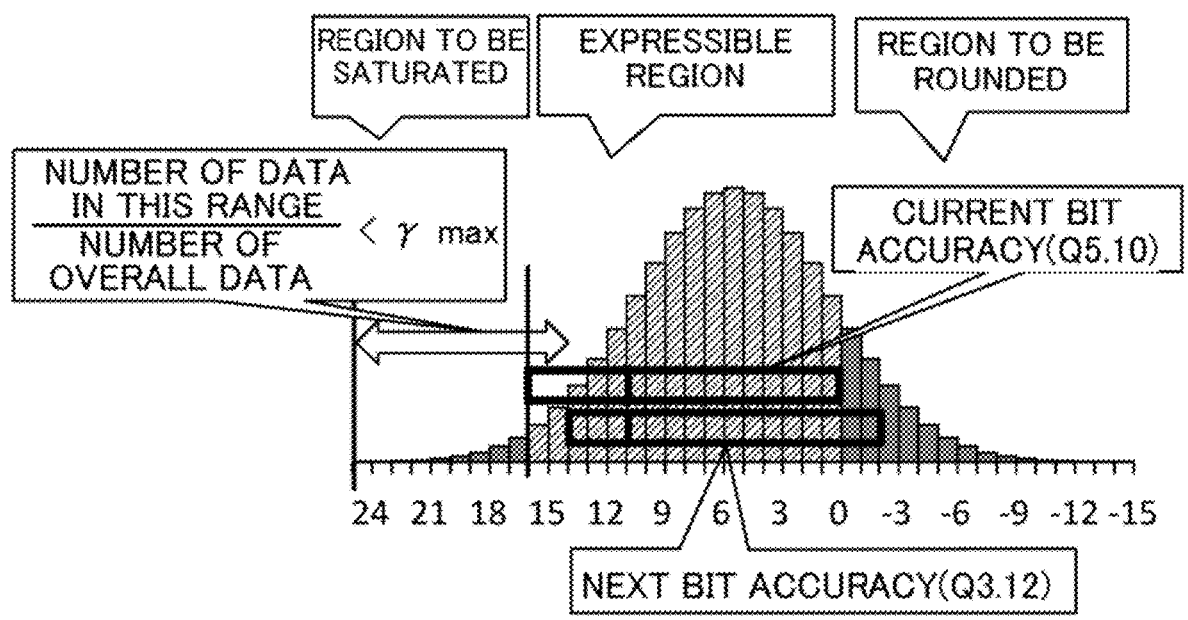
FIG. 9 is a diagram illustrating an example of an updating process on a decimal point position.
Figure 10:
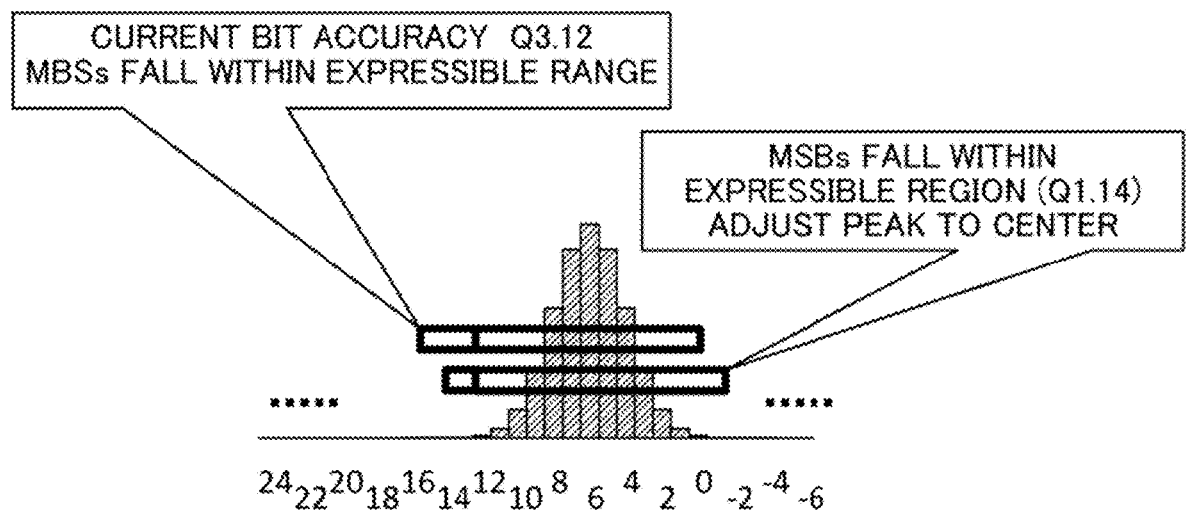
FIG. 10 is a diagram illustrating an example of an updating process on a decimal point position.

FIGS. 9 and 10 are diagrams illustrating an example of an updating process of a decimal point position; FIG. 9 illustrates a case where the most significant bit appearing in the statistical information does not fall within the expressible region of the learning apparatus 100, and FIG. 10 illustrates a case where the most significant bit appearing in the statistical information is in the expressible region.

As illustrated in FIG. 9, assuming that the present bit accuracy is (Q5. 10), the learning apparatus 100 determines, as the next bit accuracy, the largest "numerical range" in which the ratio of the number of data of a certain "numerical range" to the total number of data is less than the overflow rate rmax. In the example of FIG. 9, the learning apparatus 100 determines the next bit accuracy be (Q3. 12). The overflow rate rmax may be specified by the user, for example. Bit accuracy may be a Q format that defines bit data and, for example, (Q5. 10) defines 16-bit data with one sign bit, five integer bits, and ten decimal bits.

As illustrated in FIG. 10, assuming that the current bit accuracy is (Q3. 12), the learning apparatus 100 adjusts, for example, the peak of the histogram to be located at the center of the next bit accuracy. In the example of FIG. 10, the learning apparatus 100 adjusts the next bit accuracy to (Q1. 14). Alternatively, the learning apparatus 100 may adjust the bit accuracy such that the accuracy matches the average of the number of appearances on the histogram.

Figure 11:
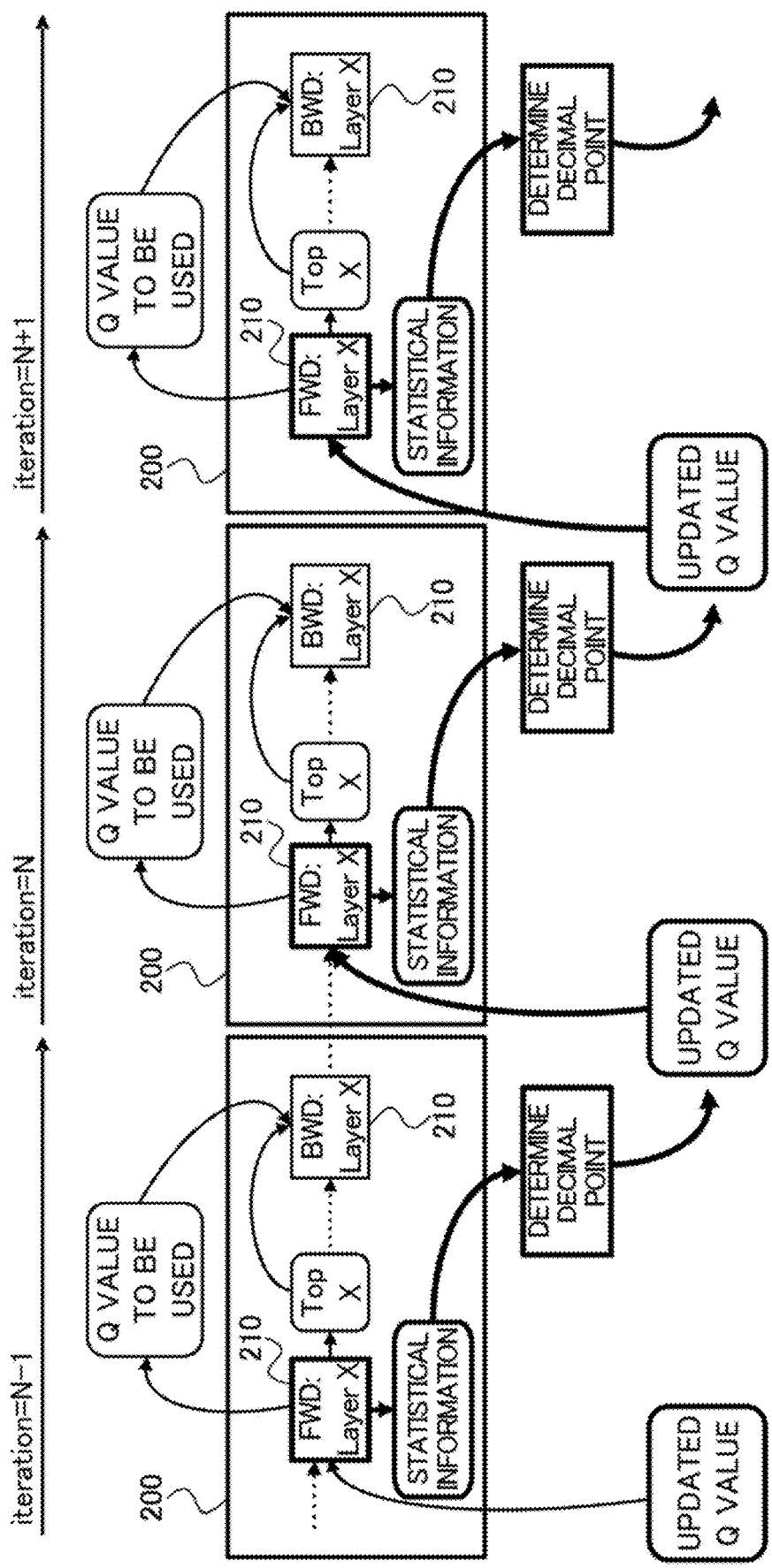
FIG. 11 is a diagram illustrating an example of a relationship between the determination of a Q-value in a forward propagation and an iteration.
Figure 12:
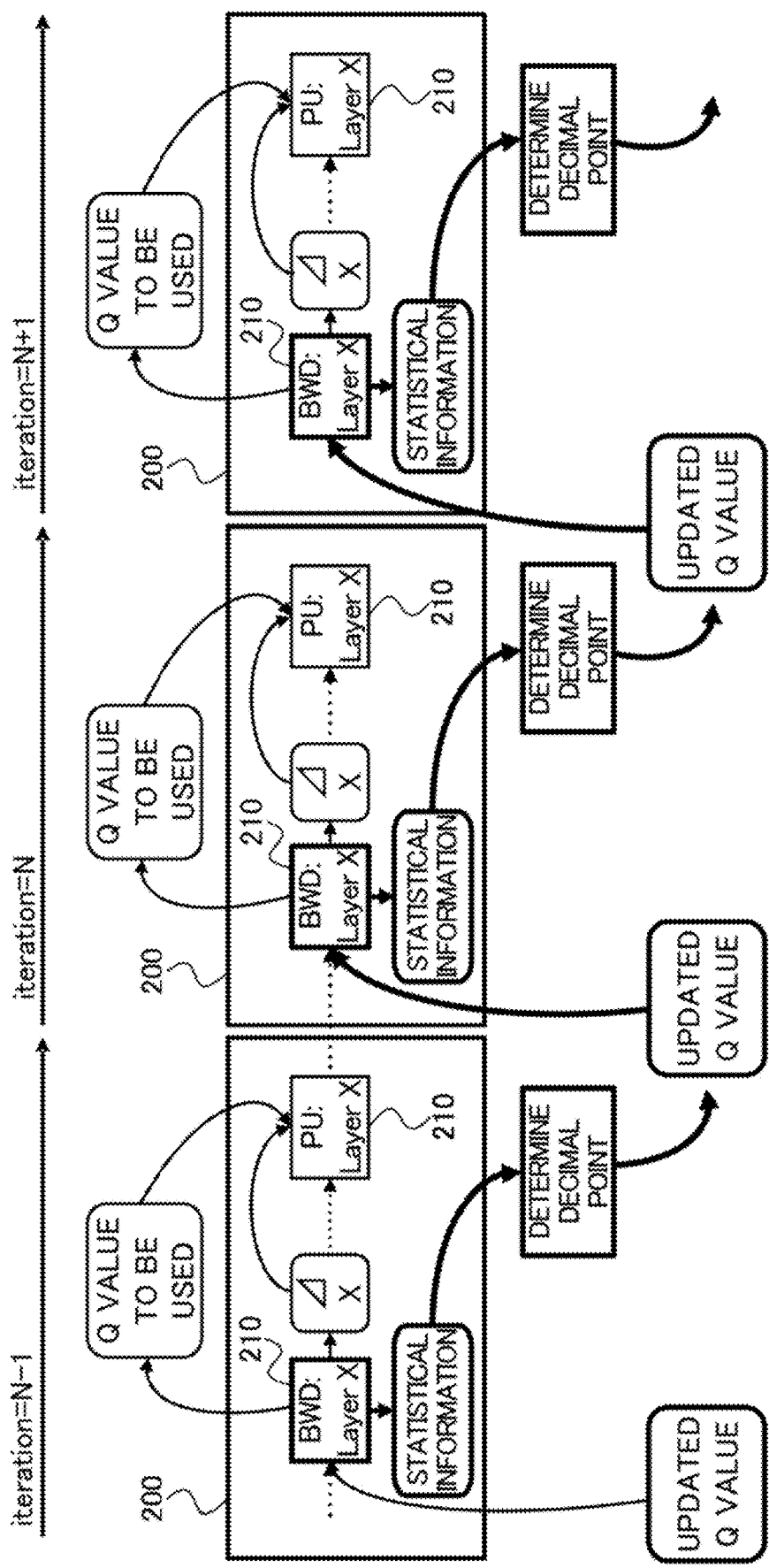
FIG. 12 is a diagram illustrating an example of a relationship between the determination of a Q-value in a backward propagation and an iteration.

FIGS. 11 and 12 are diagrams illustrating examples of the relationship between the determination of the Q-value in the forward (FWD) propagation and the backward (BWD) propagation and iterations, respectively. Here, the Q value means decimal point position information indicating the number of bits to shift the fixed point. Hereinafter, the decimal point position may be referred to as a Q value.

As illustrated in FIGS. 11 and 12, the Q value used when the iteration is N is the Q value updated using the statistical information when the iteration N−1 in both the FWD propagation and the BWD propagation. The parameters used in FWD and BWD are the same Q value. The example illustrated in FIGS. 11 and 12 corresponds to the case where the updating interval K=1 is set in the process illustrated in FIG. 7.

By determining the Q value of the next iteration on the basis of the statistical information of the previous iteration (mini-batch), the overhead of the calculation can be prevented. Using of the current statistical information means that the same calculation is performed twice for the purpose of obtaining the statistical information and the calculation of the layer 210.

Figure 13:
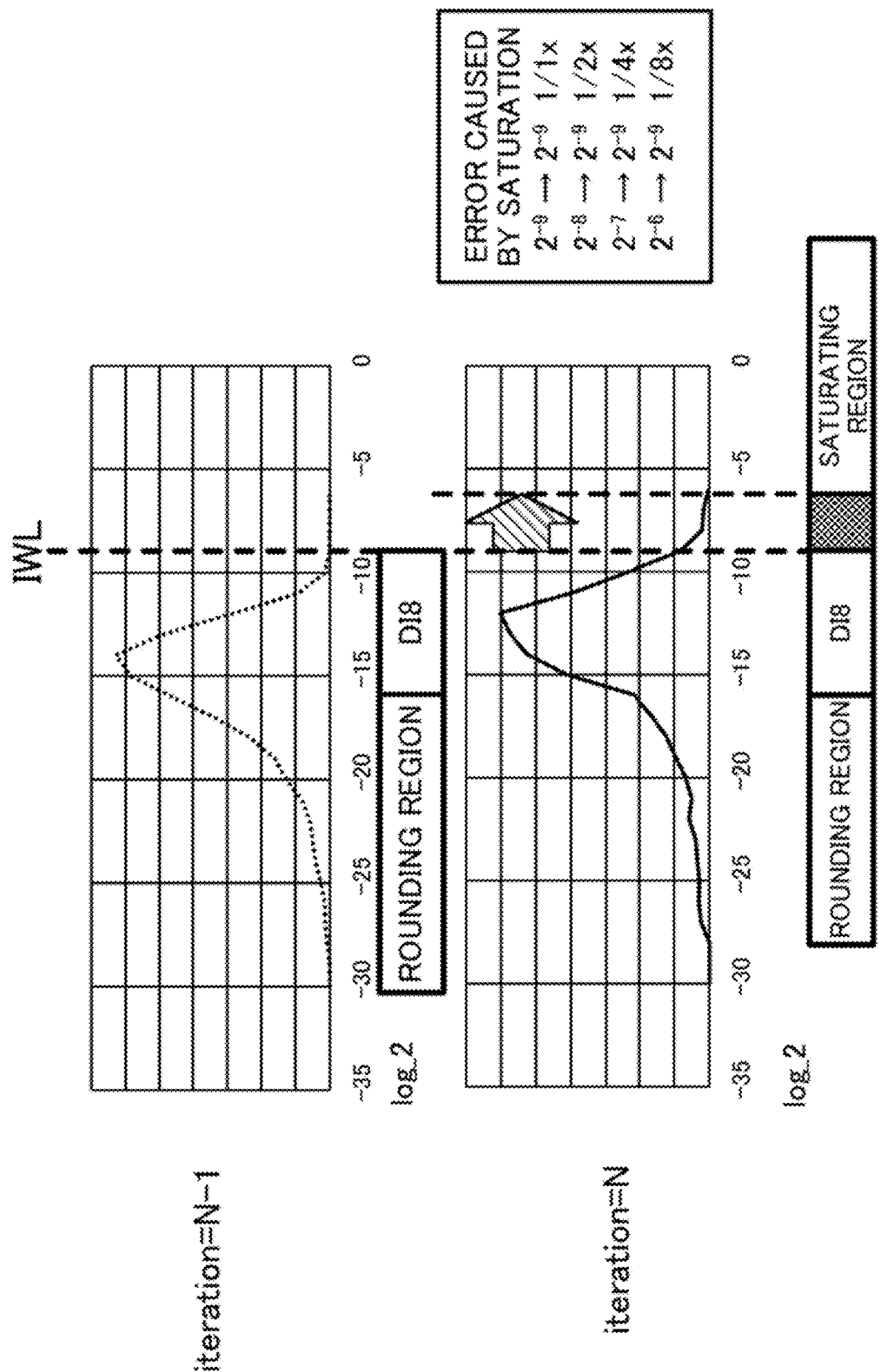
FIG. 13 is a diagram illustrating an example of an Integer Word Length (IWL)

FIG. 13 is a diagram illustrating an example of an IWL. Here, an IWL means a decimal point position of the most significant bit of a value represented by a fixed decimal point. In the case illustrated in FIG. 13, the dashed line indicating the largest decimal point position of a 8-bit fixed-point denoted as "DI8" is the IWL. The region of "DI8" is in the expressible region of the 8-bit fixed point. In the example of FIG. 13, an IWL is assumed to become larger (positive) from the left to the right of the drawing.

FIG. 13 exemplarily illustrates histograms of the statistical information when the iterations are N−1 and N of the output data of a certain layer 210. As described above, the boundary line rounding and saturating in the iteration N is estimated in the iteration N−1. In the example of FIG. 13, the dashed line indicating the IWL is the estimated saturating position, and the distribution in the iteration N is the result actually calculated. In other words, FIG. 13 illustrates the case where the histogram of the actual calculating result at iteration N is greater than the IWL estimated at iteration N−1 by $2^3$ (2 to the 3rd power; 3 bits).

As illustrated in FIG. 13, when the IWL is shifted by three bits, saturation for three bits is unnecessarily performed in the iteration N. In this case, the saturating processing is performed on a shaded region of the saturation region. In the example of FIG. 13, values greater than $2^{-9}$ of the iteration N are saturated to $2^{-9}$ (see shaded region).

As described above, in the case where the Q value between iterations largely fluctuates, the Q value estimated from the statistical information of the previous iteration comes not to match the actual data distribution, and a situation may occur in which the bit width of the fluctuated fixed point is not effectively utilized.

In the DNN, the parameters of each layer 210 are updated on the basis of the following equation (2). In the following equation (2), the symbol μ represents the learning rate (Learning Rate), and ΔW represents gradient information of the previous iteration (e.g., the gradient of the error).

$$W = W - \mu \Delta W \quad (2)$$

In the initial stage of learning, the value of the learning rate μ is large, and is gradually decreased as learning progresses. Therefore, when the learning rate μ is large, the change given to W is large, so that the parameters of the overall neural network and the propagated data largely fluctuate. As described above, a situation occurs in which the fluctuation of the IWL as illustrated in FIG. 13 becomes large at the relatively initial stage of learning.

If the IWL largely fluctuates, an error is generated between the decimal point position and the distributions of the actual parameter or an output, and the quantization error in the saturating processing of the fixed point becomes large, so that the learning becomes unstable, in other words, the recognition accuracy may deteriorate. For example, as data that is saturated increases, the recognition accuracy is largely degraded.

The above fluctuation of the IWL occurs in either the positive or negative direction, but in the negative case, the merit of the saturating direction vanishes and the data to be rounded increases. For example, using probability rounding can prevent or reduce degradation due to rounding quantization errors. However, since the absolute value of the value is larger in saturating than in rounding, it can be said that the rounding is more affected by degradation due to quantization.

As a solution to the above, in the first embodiment, a method of suppressing the deterioration of the accuracy of the learning result of the learning model even when the IWL variation becomes positive and the saturation increases will be described.

Figure 14:
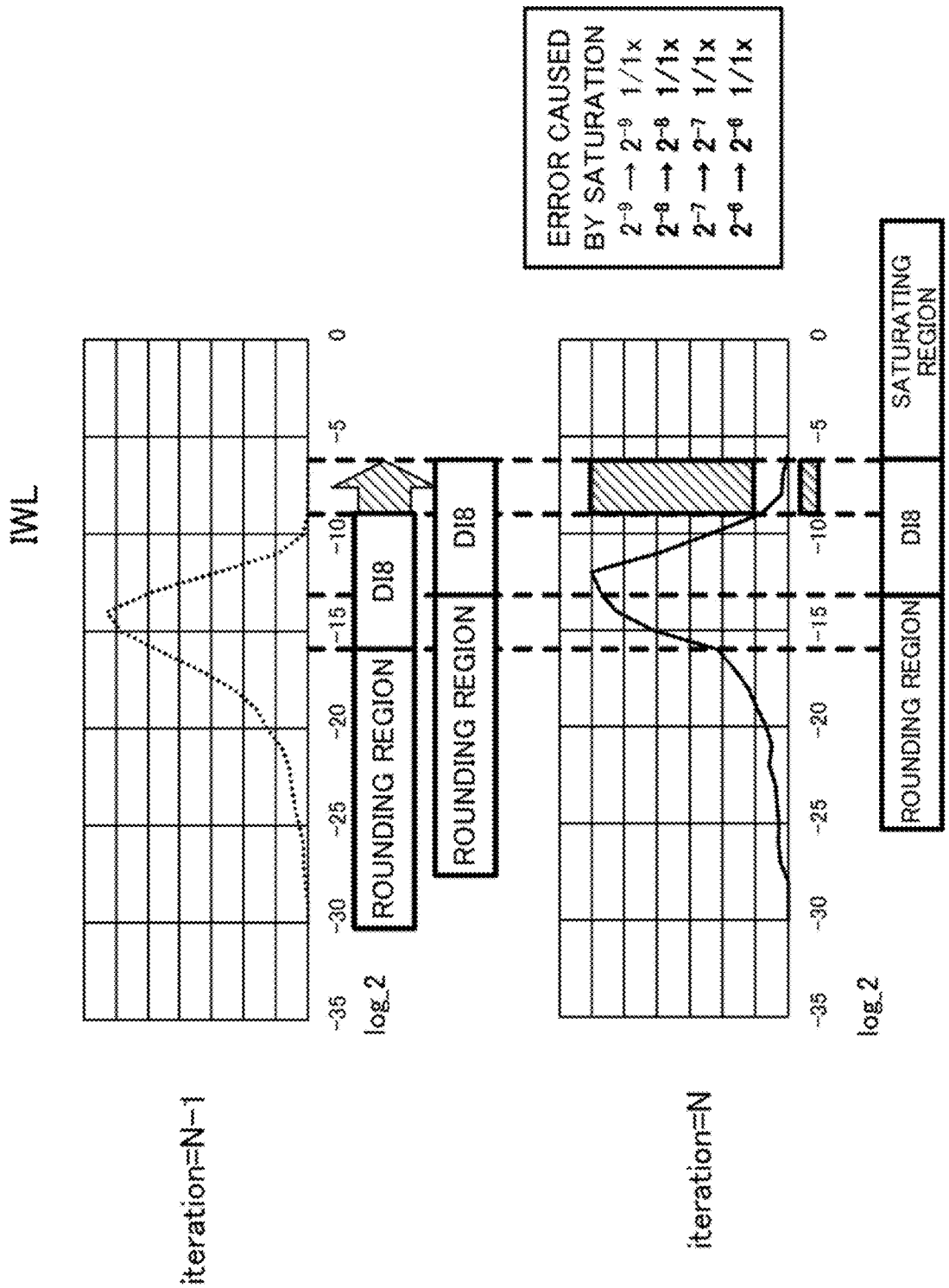
FIG. 14 is a diagram for explaining an example of a case where an offset is applied to a decimal point position.

FIG. 14 is a diagram illustrating an example of the case where an offset is provided in the decimal point position (IWL). In the first embodiment, an IWL obtained by applying an offset to the IWL determined (increasing by the offset) in the previous iteration is used in the next iteration.

In the example of FIG. 14, like in the example of FIG. 13, a specific offset (in the example of FIG. 14, "3") is applied to the IWL estimated at the iteration N−1. An offset may be set by the user, for example.

By applying an offset to the IWL, the IWL fluctuation comes to be positive. Even when saturation increases, a saturating process do not have to be executed on values of $2^{-8}$ to $2^{-6}$ that are greater than the $2^{-9}$ at the iteration N, as illustrated in FIG. 14, and the error caused by saturation can be eliminated or reduced.

As described above, by providing the offset to the IWL, data corresponding to the region indicated by the hatched line in FIG. 14 can be relieved from saturating, and the deterioration in the estimation accuracy of the learning apparatus 1 can be avoided.

1-3) Example of Offset Setting Process on IWL

The determiner 14 determines an offset (offset amount) to be applied to the IWL during the learning of the CNN 20 by the learning unit 12 on the basis of the information stored in the information storing unit 15, and determines the IWL on the basis of the determined offset.

For example, the determiner 14 may determine or change the offset at a predetermined timing such as a timing at which the learning starts and a timing at which the learning rate μ changes. A learning rate μ is an example of information related to the progress of learning (training) or the degree of the progress of learning (training). The timing at which the learning rate μ changes may be, for example, a timing at which the learning rate μ is comes below a predetermined threshold value. Multiple thresholds may be used.

Figure 15:
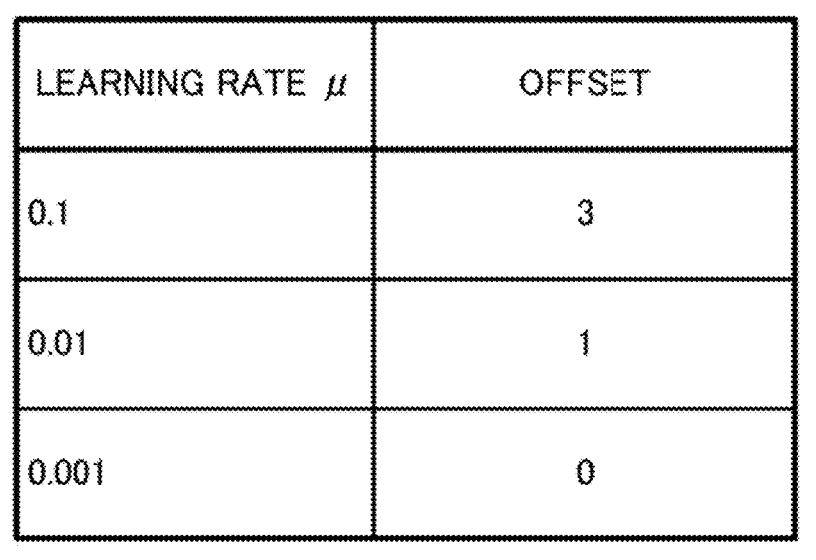

As illustrated in FIG. 15, the information storing unit 15 stores offset information in which thresholds (or ranges) of the learning rate μ and offsets are associated with each other.

As illustrated in FIG. 15, the offset information may be stored in a table format, or may be stored in various formats such as a DB and an array.

FIG. 15 illustrates an example in which the offset "3" is set when the learning rate μ is "0.1" or more, the offset "1" is set when the learning rate μ is less than "0.1" and "0.01" or more, and the offset "0" is set when the learning rate μ is less than "0.01" and "0.001" or more. The offset may also be set to "0" when the learning rate μ is less than "0.001". In the example of FIG. 15, the learning rate μ of "0.1" is an example of the first threshold THA, "0.01" is an example of the second threshold THB, and "0.001" is an example of the third threshold THC.

Figure 16:
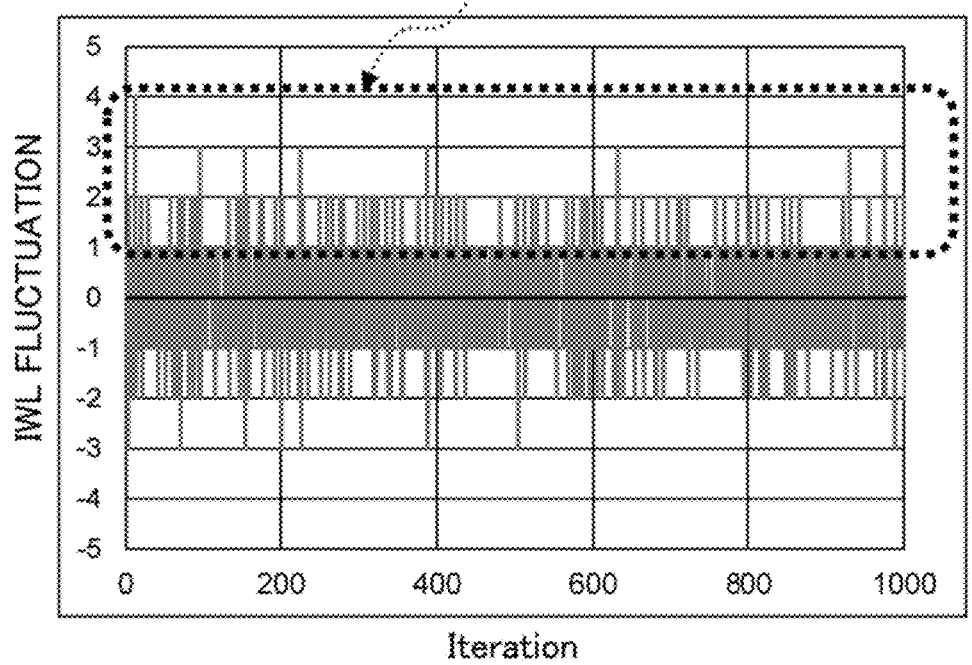
FIG. 16 is a diagram illustrating an example of a fluctuation of an IWL according to a learning rate.
Figure 17:
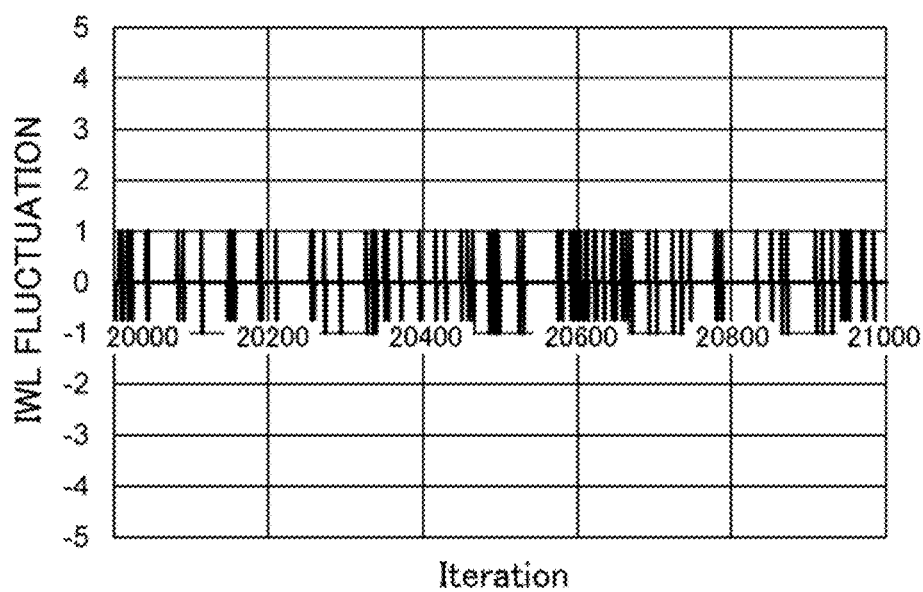
FIG. 17 is a diagram illustrating an example of a fluctuation of an IWL according to a learning rate.

FIGS. 16 and 17 are diagrams illustrating examples of fluctuations of IWLs according to the learning rate μ, respectively. FIG. 16 illustrates a case where the learning rate μ is 0.1, which is the initial learning stage, and FIG. 17 illustrates a case where the learning rate y is 0.01, which is the middle learning stage. In FIG. 16 and FIG. 17, the horizontal axis represents the iteration, and the vertical axis represents the fluctuation of the IWL, for example, the difference from the previous IWL.

As illustrated in FIG. 17, when the fluctuation of the IWL is within one bit, the recognition accuracy by the learning apparatus 1 tends to hardly drop even if the offset is not used. On the other hand, as illustrated in FIG. 16, when the fluctuation of the IWL is 2 or more, the recognition accuracy by the learning apparatus 1 tends to largely lower.

For the above, in the first embodiment, information defining an offset on the basis of the progress of learning exemplified by the correlation between the progress of learning, i.e., the learning rate μ, and the fluctuation of the IWL is used so that the decimal point position can be appropriately set even when the fluctuation of the IWL is 2 or more.

For example, an offset determiner 14a of the determiner 14 may refer to the information storing unit 15 at the timing of starting the learning or at the timing of changing the learning rate μ, compare the values of the learning rate μ at that time with the thresholds (range), and determine the corresponding offset.

Then, when determining the IWL, in other words, the decimal point position, an IWL determiner 14b of the determiner 14 updates the IWL by applying the determined offset on the basis of the calculation result of each layer 21 by the learning unit 12. The updated IWL is used in the next iteration.

As described above, the offset determiner 14a is an example of a first determination unit that determines the offset amount for correcting the decimal position of the fixed-point data used for leaning in accordance with the degree of progress of the learning when the CNN 20 is repeatedly trained.

The IWL determiner 14b is an example of a second determination unit that determines the decimal point position of fixed-point number data used for learning on the basis of the offset amount.

Figure 18:
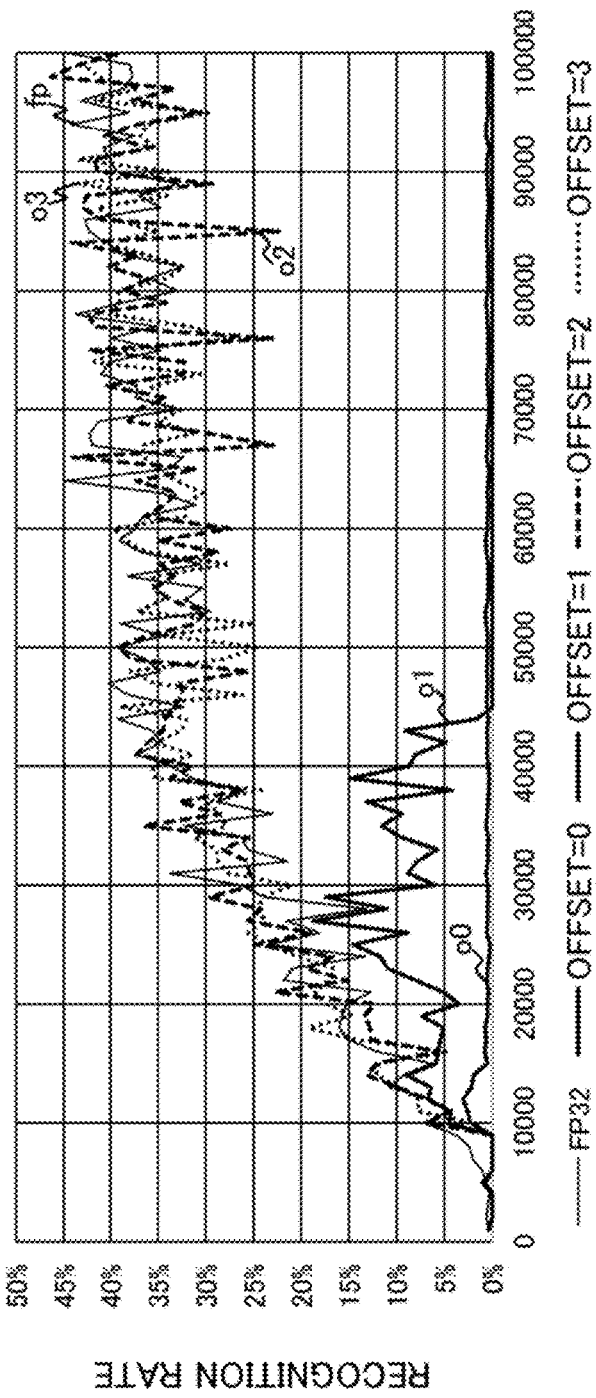
FIG. 18 is a diagram illustrating an example of recognition accuracy for each offset in a 16-bit fixed point.

FIG. 18 is a diagram illustrating an example of the recognition accuracy of each offset in a 16-bit fixed point. Hereinafter, a 32-bit floating point (FP) is regarded as a reference recognition accuracy without quantization. As illustrated in FIG. 18, when the offset is 0 and 1 (denoted by "o0" and "o1" in FIG. 18), the recognition accuracy, for example, the recognition rates, are lower than that of 32-bit FP (denoted by "fp" in FIG. 18). On the other hand, when the offset is 2 and 3 (denoted by "o2" and "o3" in FIG. 18), the recognition accuracy after quantization is equivalent to that of the 32-bit FP.

Figure 19:
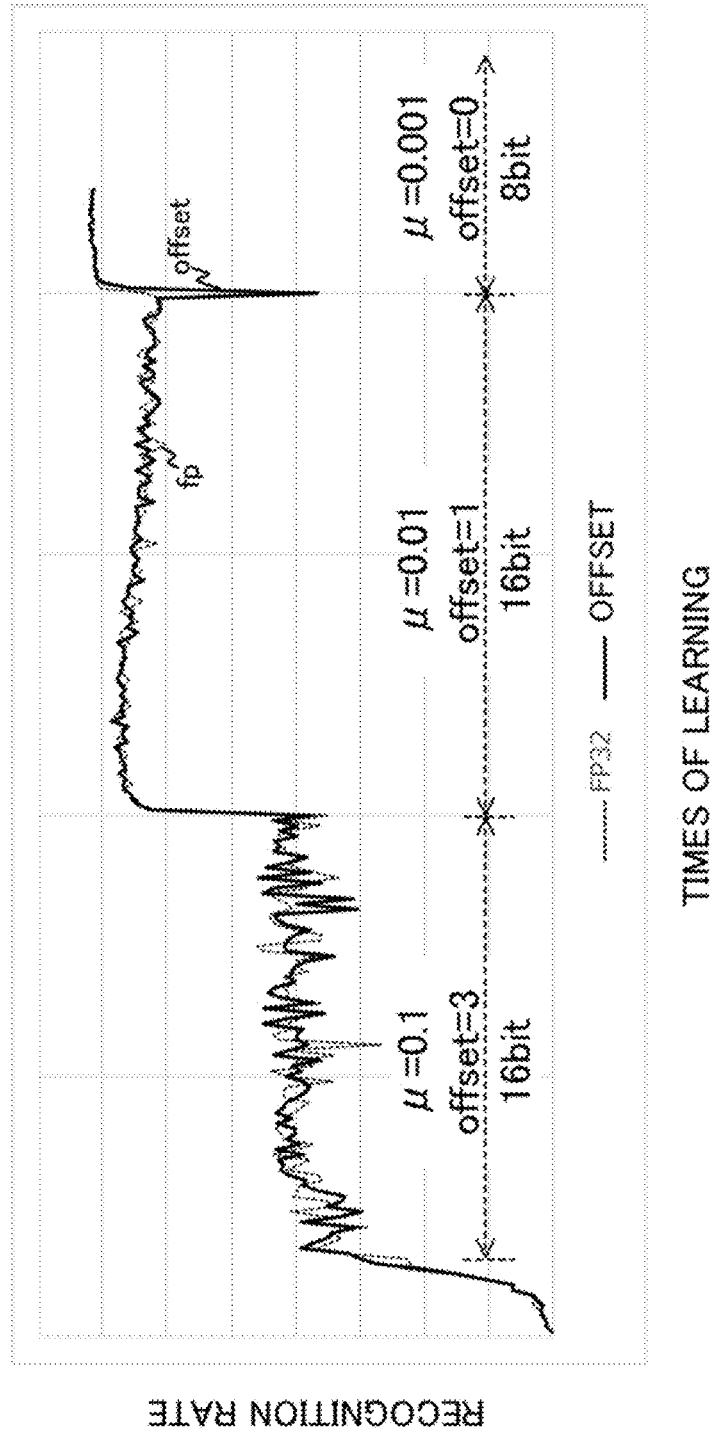
FIG. 19 is a diagram illustrating an example of recognition accuracy in the case where a 16-bit fixed point and an 8-bit fixed point are mixed and the offset is changed with a progress of learning.

FIG. 19 is a diagram illustrating an example of the recognition accuracy in the case where the offset is changed in accordance with the progress of learning under a state where a 16-bit fixed point and an 8-bit fixed point are mixed. As exemplified in FIG. 19, when the offsets are changed with the change in the learning rate μ according to the table illustrated in FIG. 15, it is understood that the recognition accuracy equivalent to that of the 32-bit FP can be obtained even when the 16-bit fixed point and the 8-bit fixed point are mixed.

As described above, the learning apparatus 1 sequentially acquires and accumulates statistical information obtained by training the layer 21 in the respective iterations during the training of the CNN 20. These statistical information may be stored, for example, in a register or a memory provided in or connected to hardware such as LSI that performs the learning and inferring of the CNN 20.

For example, the determiner 14 updates the decimal point position of each layer 21 on the basis of the statistical information of the learning of the latest K times of the mini-batch (in the first embodiment, K=1). The determined fixed-point number may be used as a reference for learning the mini-batches of the ensuring K times containing the current iteration (in the first embodiment, the current iteration).

This means that, the offsets that the determiner 14 determines on the basis of the information storing unit 15 may be applied to the IWL of each layer 21 updated on the basis of the statistical information of the previous iteration. Then, the learning unit 12 may perform calculation of each layer 21 in the current iteration on the basis of the IWL of each layer 21 to which the offset is applied.

Figure 21:
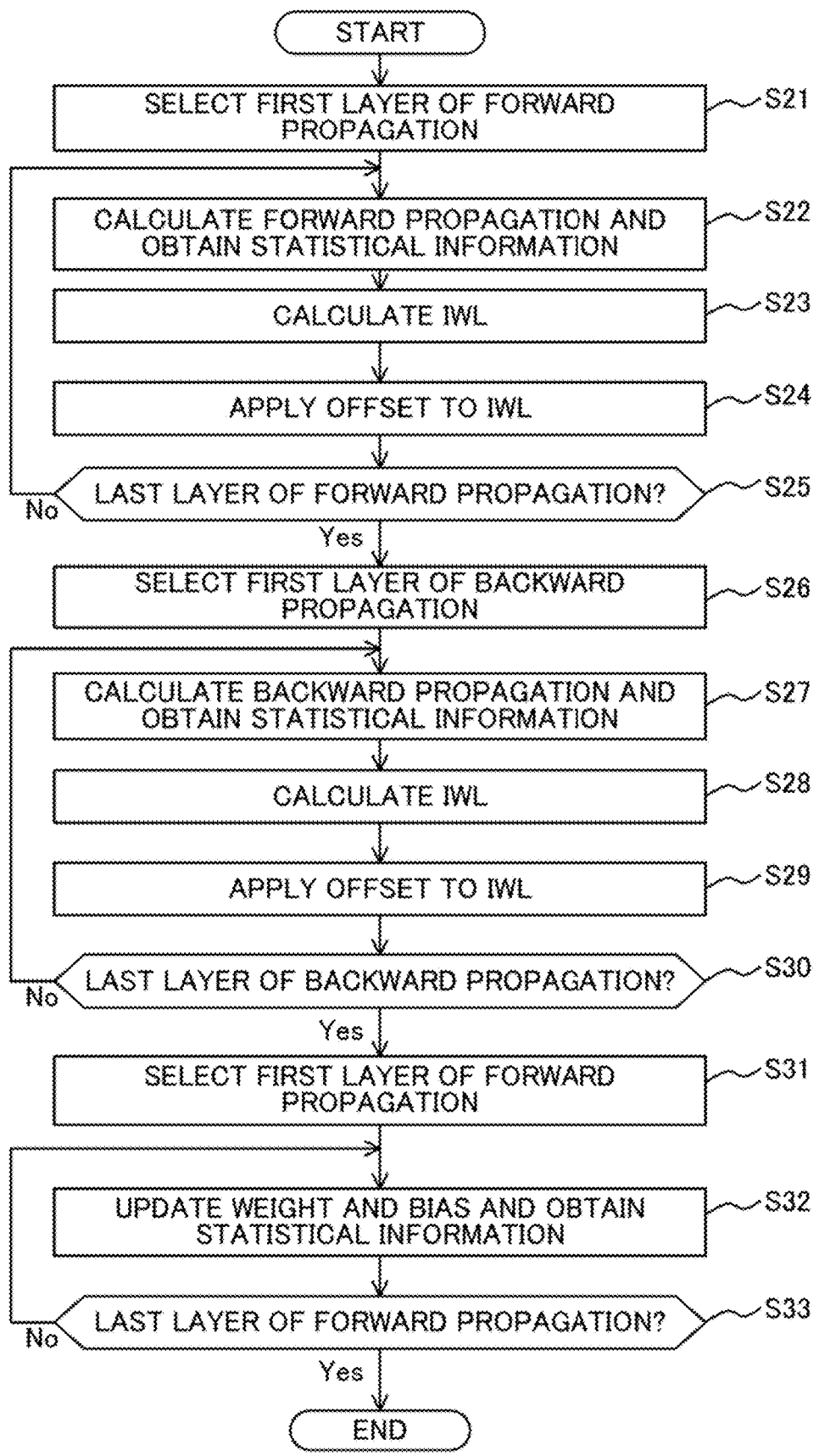
FIG. 21 is a flowchart illustrating an example of the operation of a batch learning process illustrated in FIG. 20.

Here, the step order is not limited to this, and alternatively, the determiner 14 may calculate an IWL (including an offset) to be used in the calculation of the next iteration every time the calculation of each layer 21 of the current iteration is completed, for example, as described below with reference to FIG. 21.

As described above, the determiner 14 is an example of an updating unit that updates the decimal point position on the basis of the statistical information, and the offset determiner 14a applies the offset amount to the decimal point position to be updated. That is, the decimal point position can be appropriately corrected even in the initial stage of learning during which the IWL tends to largely fluctuate, for example, by the correction of the decimal point position at two stages of updating the decimal point position on the basis of the statistical information and applying the offset.

As described above, according to the learning apparatus 1 of the first embodiment, the offset determiner 14a determines, when repeatedly training the CNN 20, the offset amount for correcting the decimal point position of the fixed-point data used for the learning in accordance with the degree of progress of learning. In addition, the IWL determiner 14b determines the decimal point position of the fixed-point number data to be used for learning on the basis of the offset amount.

This makes it possible to appropriately correct the decimal point position even when the IWL largely fluctuates, for example, in the initial stage of the learning, so that it is possible to suppress the deterioration of the accuracy of the learning result of the learning model.

Therefore, a neural network to which a dynamic fixed-point number can be applied can be increased.

In addition, since the deep learning can be performed with high accuracy by means of a fixed-point number, the data transfer amount and the circuit scale of the calculator can be reduced, and thereby consumption power can be reduced. For example, if the 32-bit floating-point number is reduced to a 16-bit fixed-point number, memory usage and the data transfer amount can be reduced by half. In addition, the circuit scale of the product-sum calculation in the LSI can be reduced to about half.

[1-4] Example of Operation

Figure 20:
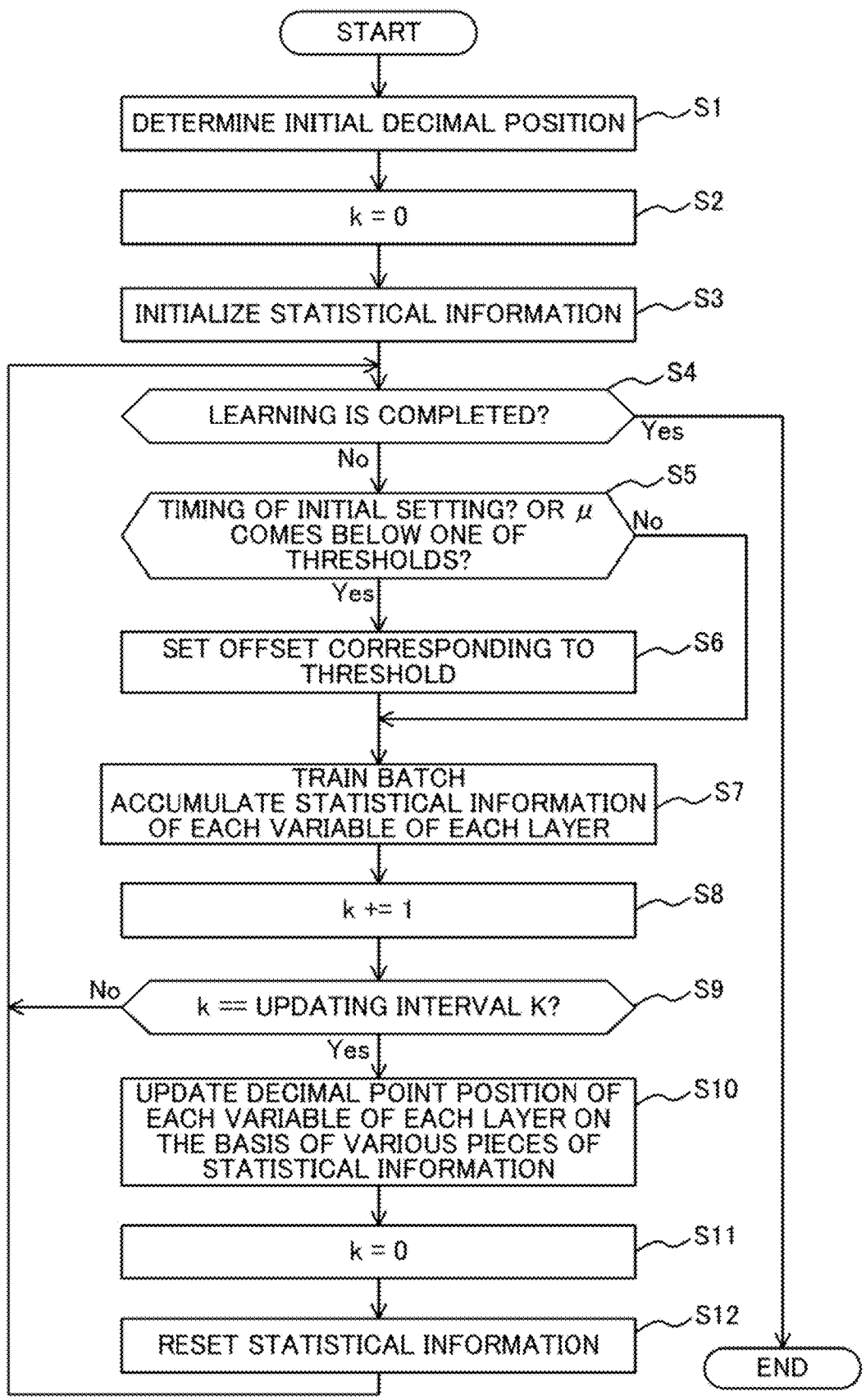
FIG. 20 is a flowchart illustrating an example of the operation of the learning apparatus according to the first embodiment.

Next, an example of an operation of the learning apparatus 1 according to the first embodiment will now be described with reference to FIGS. 20 and 21. FIG. 20 is a flowchart illustrating an example of the operation of the learning apparatus 1 according to the first embodiment, and FIG. 21 is a flowchart illustrating an example of the operation of the batch learning process illustrated in FIG. 20.

As illustrated in FIG. 20, the learning apparatus 1 determines an initial decimal point position (Step S1), sets the number of times k=0 (Step S2), and initializes the statistical information (Step S3).

The learning unit 12 of the learning apparatus 1 determines whether the learning of the CNN 20 has been completed (Step S4). If the learning is determined to be completed (Yes in Step S4), the process ends. On the other hand, if the learning is determined not to be completed (No in Step S4), the process proceeds to Step S5. As the criterion for judging the completion of learning, for example, any one or a combination of two or more of various criteria such as that the error of the learning result falls below the threshold value, that the accuracy of the learning result exceeds the threshold value, and that the number of times of learning to exceeds the threshold value may be used.

In Step S5, the determiner 14 determiners whether or not the current loop is the timing of the initial setting, or whether or not the learning rate p, which is an example of the degree of progress of the learning, comes below any of the thresholds THA to THC (Step S5). If it is determined that the current loop is not the timing of the initial setting and also the learning rate μ does not come below any of the thresholds THA to THC (No in Step S5), the process proceeds to Step S7.

On the other hand, if it is determined that the current loop is the timing of the initial setting and also the learning rate μ comes below any of the thresholds THA to THC (Yes in Step S5), the determiner 14 sets an offset corresponding to the threshold value at which the learning rate μ comes below with reference to the information storing unit 15 (Step S6). For example, when determining that the learning rate μ comes below the threshold THA, the determiner 14 selects the offset "3" corresponding to the threshold THA "0.1" (see FIG. 15). Then, the process proceeds to Step S7.

In Step S7, the learning unit 12 trains batches for the CNN 20, and accumulates the statistical information of the respective layers 21.

In addition, the learning unit 12 adds 1 to k (Step S8), and determines whether k reaches the updating interval K (Step S9). If k is determined not to reach the updating interval K yet (No in Step S9), the process proceeds to Step S4. On the other hand, if k is determined to reach the updating interval K (Yes in Step S9), the process proceeds to step S10. The first embodiment assumes that the updating interval K is 1.

In step S10, the determiner 14 updates the decimal point position of each variable of each layer 21 on the basis of various pieces of the statistical information. The decimal point position updated in this process is used to express each variable in the next update interval.

The determiner 14 sets (initializes) k=0 (Step S11), resets the statistical information (step S12), and moves the process to Step S4.

Note that the processing order of steps S1 to S3 is not limited to that of the example of FIG. 20, and any step may be performed first, or these steps may be performed in parallel. The processing order of steps S11 and S12 is not limited to that of the example of FIG. 20, and any step may be performed first, or these steps may be performed in parallel.

Next, with reference to FIG. 21, an example of the operation of the process of step S7 of FIG. 20 will now be described. As illustrated in FIG. 21, the learning unit 12 selects the first layer 21 of the forward propagation in the learning of the batch (Step S21).

The learning unit 12 calculates forward propagation of the selected layer 21 and obtains the statistical information (Step S22) In the calculation in step S22, the learning unit 12 may use the IWL calculated in the process on the previous iteration (when the updating interval K=1).

The determiner 14 calculates the IWL for the layer 21 (Step S23). The calculation of the IWL may be performed by a known method using the calculation result on each layer 21. Hereinafter, a function for calculating the IWL is represented by "f(x)".

The determiner 14 applies the offset determined in Step S6 of FIG. 20 to the IWL (Step S24). For example, the determiner 14 obtains the IWL applied with the offset using the following equation (3).

$$IWL = f(x) + \text{offset} \tag{3}$$

The IWL applied with the offset is used for the calculation of the same layer 21 in the next updating interval exemplified by in the next iteration (when K=1).

The learning unit 12 determines whether the layer 21 being selected is the last layer 21 of the forward propagation (Step S25). If determining the layer 21 not to be the last layer of the forward propagation (No in Step S25), the learning unit 12 selects the next layer 21 in the forward propagation direction and moves the process to Step S22.

On the other hand, if determining the layer to be the last layer 21 of the forward propagation (Yes in Step S25), the learning unit 12 selects the first layer 21 of the backward propagation (Step S26).

The learning unit 12 calculates a backward propagation of the selected layer 21 and obtains the statistical information (Step S27). In the calculation of Step S27, the learning unit 12 may use the IWL calculated in the process of the previous iteration (when the updating interval K=1).

The determiner 14 calculates the IWL of the layer 21 (Step S28), and applies the offset determined in Step S6 of FIG. 20 to the IWL (Step S29). For example, the determiner 14 obtains the IWL applied with the offset using the above equation (3).

The learning unit 12 determines whether the layer 21 being selected is the last layer 21 of the backward propagation (Step S30). If determining the layer 21 not to be the last layer of the backward propagation (No in step S30), the learning unit 12 selects the next layer 21 in the backward propagation direction and moves the process to Step S27.

On the other hand, if determining the layer to be the last layer 21 of the backward propagation (Yes in Step S30), the learning unit 12 selects the first layer 21 of the forward propagation (Step S31).

The learning unit 12 updates the weight and the bias of the selected layer 21 and obtains the statistical information on the selected layer 21 (Step S32), and determines whether or not the layer 21 being selected is the last layer 21 of the forward propagation (Step S33). If determining the layer 21 not to be the last layer 21 of the forward propagation (No in Step S33), the learning unit 12 selects the next layer 21 of the forward propagation direction and the process proceeds to Step S32. On the other hand, if determining the layer to be the last layer 21 of the forward propagation (Yes in Step S33), the process ends.

[2] Second Embodiment

Next, the second embodiment will now be described. As described above with reference to FIGS. 16 and 17, when the fluctuation of the IWL is within 1 bit, the recognition accuracy by the learning apparatus 1 tends to be hardly lowered even if the offset is not used, whereas when the fluctuation of the IWL is 2 bits or more, the recognition accuracy tends to be largely lowered.

Therefore, in the second embodiment, a method of detecting whether the fluctuation of the IWL is 2 bits or more and determining the offset to be applied to the IWL on the basis of the detection result will be described.

Figure 22:
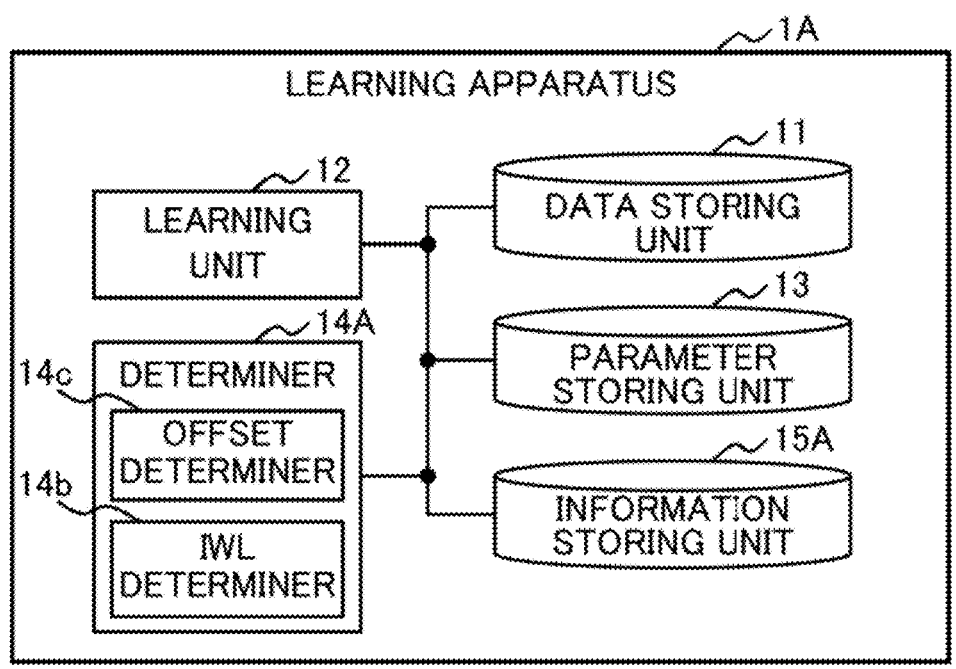
FIG. 22 is a block diagram schematically illustrating an example of the functional configuration of a learning apparatus according to a second embodiment.

FIG. 22 is a block diagram schematically illustrating an example of the functional configuration of the learning apparatus 1A according to the second embodiment. As illustrated in FIG. 22, the learning apparatus 1A includes a determiner 14A and an information storing unit 15A in place of the determiner 14 and the information storing unit 15 included in the learning apparatus 1 according to the first embodiment, respectively. The description not referred to below is the same as that of the first embodiment.

The determiner 14A may determine or change the offset at a predetermined timing such as a timing at which the learning starts and a timing at which the learning rate $\mu$ changes. The timing at which the learning rate $\mu$ changes may be, for example, the timing at which the learning rate $\mu$ becomes less than any one of the first threshold THA to the third threshold THC, similarly to the first embodiment.

The determiner 14A may include an offset determiner 14c in place of the offset determiner 14a of the first embodiment.

For example, the offset determiner 14c may detect an amount of fluctuation of the IWL between successive iterations during the measuring period C from a predetermined timing, and count the number of times of detection for each amount of fluctuation. The amount of fluctuation can also be referred to as the magnitude of a change in the decimal point position. An example of an amount of fluctuation may include the "difference" between the IWL of the current iteration and the IWL of the previous iteration. Here, the offset determiner 14c may set the offset to a fixed value such as "0" in order to accurately measure (detect) the amount of fluctuation of the IWL in the measuring period.

As an example, the offset determiner 14c according to the second embodiment may measure "the number N3 of times the difference becomes +3 or more" and "the number N2 of times the difference becomes +2 or more", respectively, and may accumulate the measured number of times (the number of iterations). The difference "+3" indicates that the current IWL is increased by "3" from the previous IWL. For example, when the difference is "3" the offset determiner 14c may count up (e.g., by adding "1") each of the numbers N3 and N2.

The measuring period C may be, for example, the number of iterations (number of repeats), and may be preset by the user. For example, the measuring period C may be a number smaller (for example, a sufficiently small value such as 10% or less) than the number of iterations corresponding to a period in which the learning rate $\mu$ changes from the threshold value THA to the threshold value THB or from the threshold value THB to the threshold value THC.

Then, when the measuring period C ends, the offset determiner 14c may compare the numbers N3 and N2 of times of detection with the respective corresponding thresholds, and determine the offsets according to the comparison results.

The information storing unit 15A may store offset information in which thresholds of the number of times of detection for each amount of fluctuation and the offset amount are associated with each other. For example, the information storing unit 15A, as illustrated in FIG. 23, stores offset information in which the threshold TH3 for detection corresponding to the number N3 of times of detection and the threshold TH2 for detection corresponding to the number N2 of times of detection are associated with the respective offsets. As illustrated in FIG. 23, the offset information may be stored in a table format, or may be stored in various formats such as a Database and an array.

FIG. 23 illustrates an example in which an offset "2" is set when the number N3 of times of detection is equal to or greater than the threshold TH3 for detection, and an offset "1" is set when the number N2 of times of detection is equal to or greater than the threshold TH2 for detection.

The offset determiner 14c may prioritize the comparison result for the threshold TH3 for detection associated with a large offset amount over the comparison result for the threshold TH2 for detection. When the number N3 of times of detection is less than the threshold TH3 for detection and the number N2 of times of detection is less than the threshold TH2 for detection, the offset determiner 14c may set the offset to "0".

In the example of FIG. 23, "TH3" is an example of the first threshold for detection, and "TH2" is an example of the second threshold for detection. The thresholds TH3 and TH2 may be preset by the user, for example.

The offset determined by the offset determiner 14c may be used as an offset to be applied to the IWL in the learning of each layer 21 by the learning unit 12 during a learning period from the end of the measuring period C to the timing at which the learning rate $\mu$ next changes. In other words, the offset determiner 14c may keep the determined offset after the measuring period C until the next change in the learning rate $\mu$.

Thus, the offset determiner 14c is an example of a detector or detecting unit that detects an amount of fluctuation of the decimal point position of the fixed-point number data to be used for training the CNN 20 in iteration of a predetermined number of times. The offset determiner 14c is an example of a first determination unit that determines an amount of an offset based on the number of times of detecting each amount of fluctuation in the predetermined number of iterations.

Figure 24:
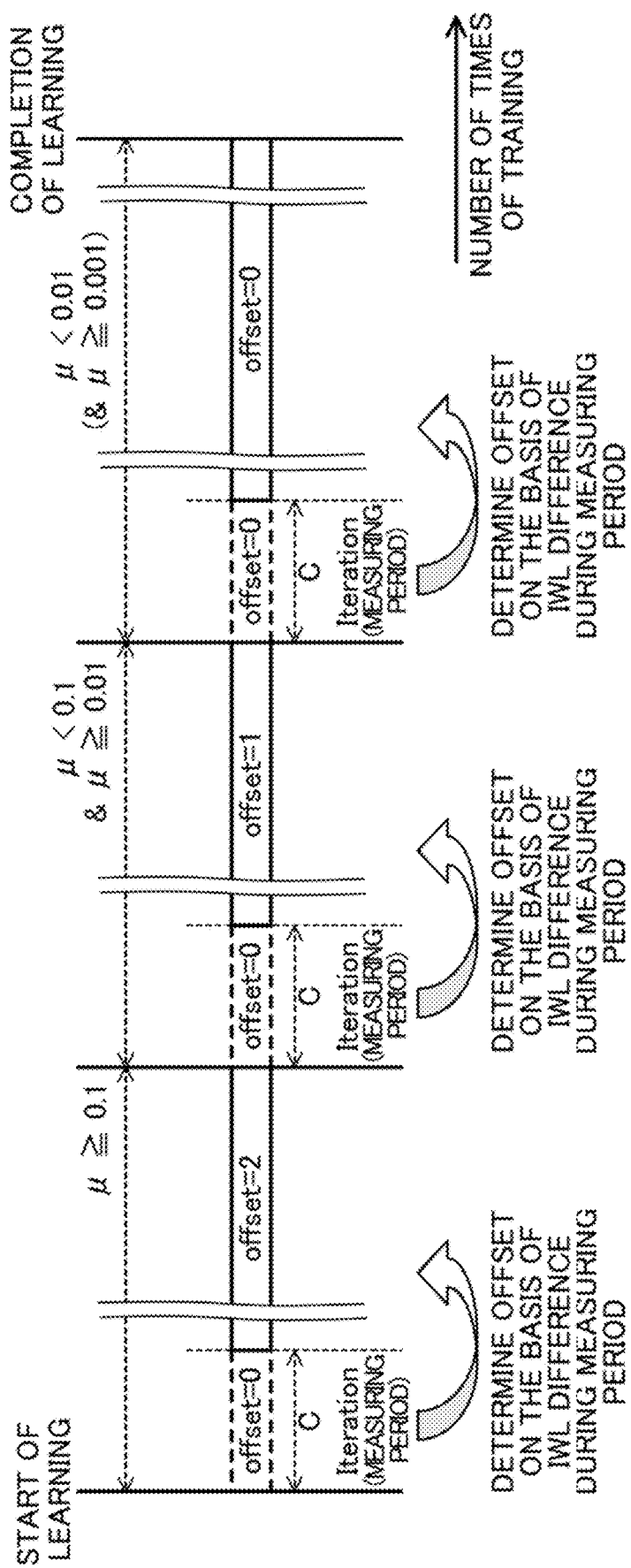
FIG. 24 is a diagram illustrating an example of an offset determining process of the second embodiment.

FIG. 24 is a diagram illustrating an example of an offset determining process of the second embodiment. As illustrated in FIG. 24, the determiner 14A determines an offset to be used in the threshold range of the current learning rate $\mu$ on the basis of the difference of IWL in the measuring period C (C iteration) each time the learning is started and each time the learning rate $\mu$ falls below the threshold THA or THB.

As described above, the same effects as those of the first embodiment can be achieved by the learning device 1A according to the second embodiment. Further, since the offset is determined on the basis of the difference of the IWL in the measuring period C, the offset can be flexibly set according to the progress of the learning, the tendency of the data of the mini-batch, and the like, and the IWL can be determined with higher accuracy.

Figure 25:
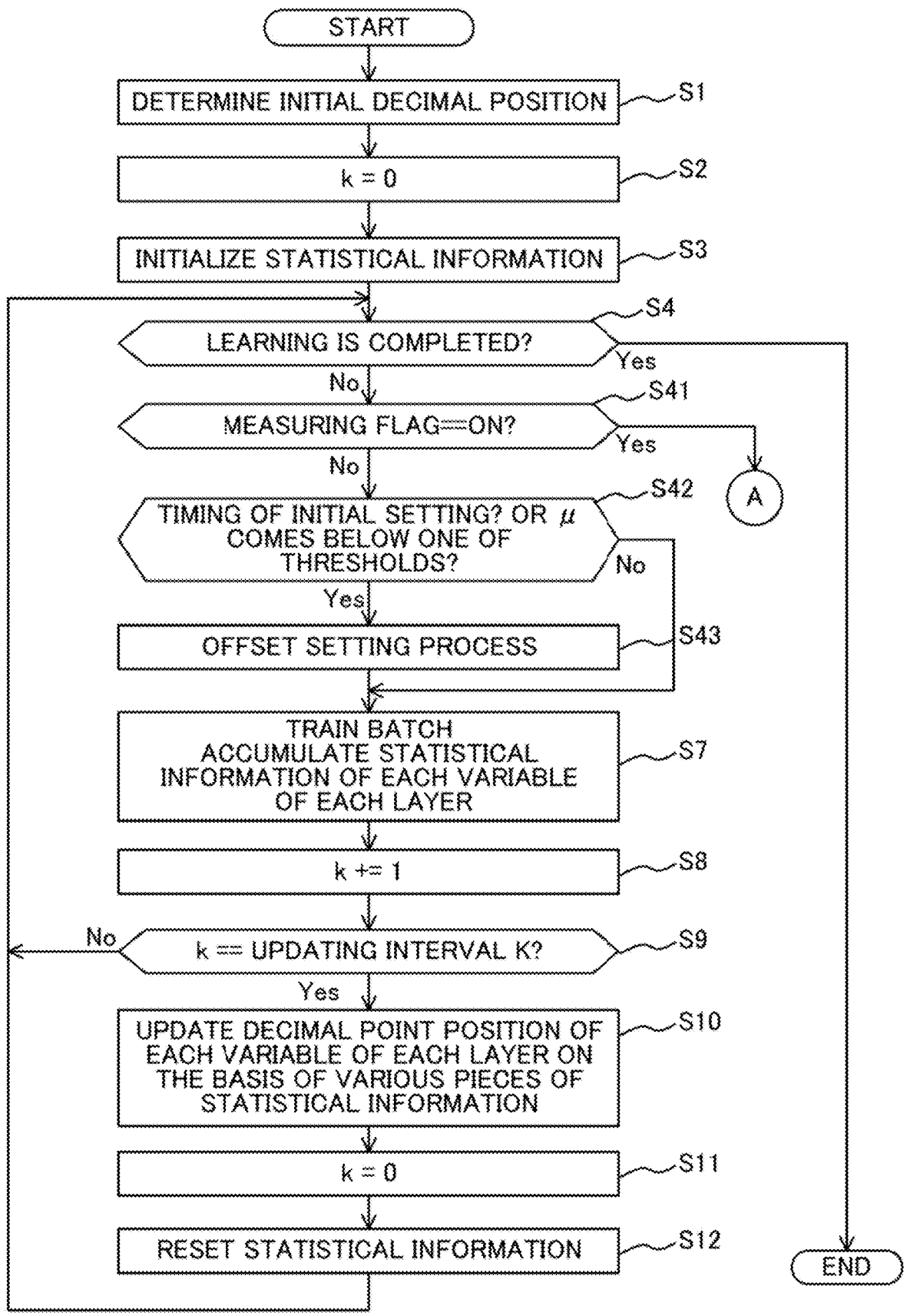
FIG. 25 is a flowchart illustrating an example of the operation of a learning apparatus of the second embodiment.
Figure 26:
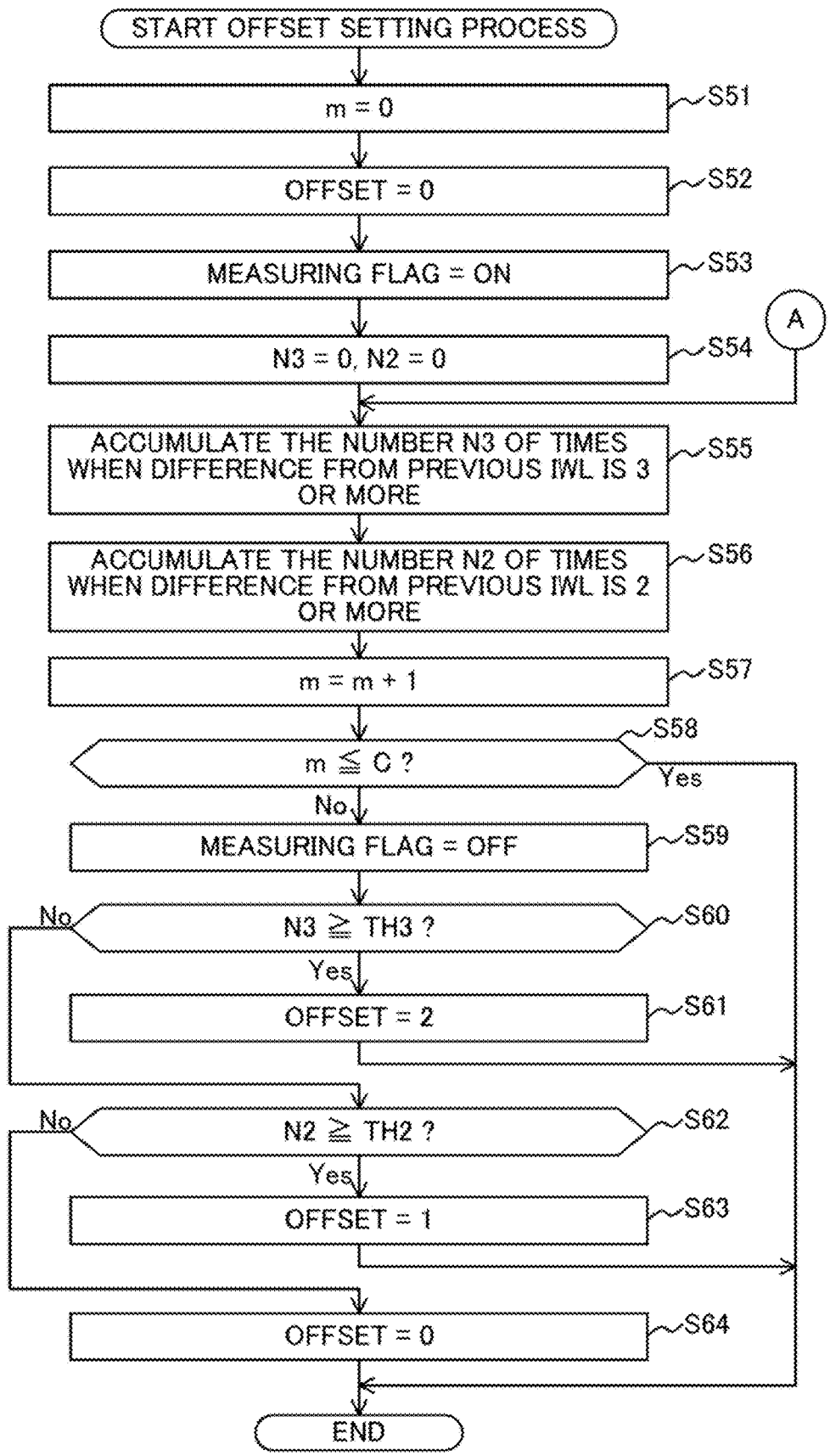
FIG. 26 is a flowchart illustrating an example of the operation of an offset setting process of FIG. 25.

Next, referring to FIGS. 25 and 26, examples of the operations of the learning device 1A according to the second embodiment will be described. FIG. 25 is a flowchart illustrating an example of the operation of the learning device 1A according to the second embodiment, and FIG. 26 is a flowchart illustrating an example of the operation of the offset setting process illustrated in FIG. 25. In FIG. 25, the steps to which the same reference numerals as those in FIG. 20 are assigned are the same as those illustrated in FIG. 20. In FIG. 25, the process of Step S7 may be executed in accordance with steps S21 to S33 of FIG. 21, similarly to the first embodiment.

In the case of No in Step S4, the determiner 14A determines whether or not a measuring flag, which will be described below, is ON (Step S41). When it is determined that the measuring flag is ON (Yes in Step S41), the process proceeds to Step S55 in FIG. 26. On the other hand, when it is determined that the measuring flag is OFF (NO in Step S41), the process proceeds to Step S42.

In Step S42, the determiner 14A determiners whether or not the current loop is the timing of the initial setting, or whether or not the learning rate μ, which is an example of the degree of progress of the learning, comes below any of the thresholds THA to THC. If it is determined that the current loop is not the timing of the initial setting and also the learning rate μ does not come below any of the thresholds THA to THC (No in Step S42), the process proceeds to Step S7.

On the other hand, if it is determined that the timing of the initial setting or the learning rate μ comes below any of the thresholds THA to THC (Yes in Step S42), the determiner 14A performs the offset setting process (Step S43), and the process proceeds to Step S7.

Next, description will now be made in relation to an example of the operation of the offset setting process in Step S43 of FIG. 25. As illustrated in FIG. 26, the determiner 14A sets (initializes) that the variable m=0 and the offset=0 (Steps S51 and S52). In addition, the determiner 14A sets the measuring flag to ON (Step S53), sets N3=0 and N2=0 (initialization) (Step S54), and moves the process to Step S55.

The measuring flag is an example of information indicating whether or not the current iteration is within the measuring period C, and indicates, for example, that the current iteration is within the measuring period C when the measuring flag is ON, and that the current iteration is outside the measuring period C when the measuring flag is OFF. The measuring flag may be managed as flag information set in a predetermined storage region such as a memory or a register included in the learning device 1A, or may be managed in various formats such as an array as control information except for the flag.

When Step S54 is completed, or in Step S41 of FIG. 25, the measuring flag is determined to be ON (Yes in Step S41), the determiner 14A executes Step S55.

In Step S55, the determiner 14A calculates the difference between the current IWL and the previous IWL, and if the difference is +3 or more, adds 1 to the number N3 of times of detection (accumulation).

When the difference between the current IWL and the previous IWL is +2 or more, the determiner 14A adds 1 to the number N2 of times of detection (accumulation) (Step S56). For example, when the difference is +2, the determiner 14A may add 1 to both the numbers N3 and N2 of times of detection.

Next, the determiner 14A adds 1 to the variable m (in increments of "1") (Step S57), and determines whether or not the variable m is equal to or less than the measuring period C (Step S58). When the variable m is equal to or less than the measuring period C (Yes in Step S58), the offset setting process ends.

If the variable m is larger than the measuring period C (No in Step 358), this means that the measuring period C has elapsed (expired). In this case, the determiner 14A sets the measuring flag to OFF (Step S59).

Next, the determiner 14A determiners whether or not the number N3 of times of detection is equal to or larger than the detection threshold TH3 (Step S60). If determining the number N3 of times of detection to be equal to or larger than the threshold TH3 for threshold (Yes in Step S62), the determiner 14A sets an offset ("2" in the example of FIG. 15) corresponding to TH3 with reference to the information storing unit 15A (Step S63), and ends the offset setting process.

If determining the number N3 of times of detection to be less than the threshold TH3 (No in Step S60), the determiner 14A determiners whether or not the number N2 of times of detection is equal to or larger than the detection threshold TH2 (Step S62). If determining the number N2 of times of detection to be equal to or larger than the threshold TH2 for threshold (Yes in Step S62), the determiner 14A sets an offset ("1" in the example of FIG. 15) corresponding to TH2 with reference to the information storing unit 15A (Step S63), and ends the offset setting process.

If determining the number N2 of times of detection to be less than the threshold TH2 (NO in Step S62), the determiner 14A sets the offset=0 (Step S64), and the offset setting process ends.

Here, the processing order of steps S51 to S54 is not limited to that of the example of FIG. 26, and any step may be performed first, or these steps may be performed in parallel. The processing order of steps S55 and S56 is not limited to that of the example of FIG. 26, and any step may be performed first, or these steps may be performed in parallel.

[3] Example of Hardware Configuration

Figure 27:
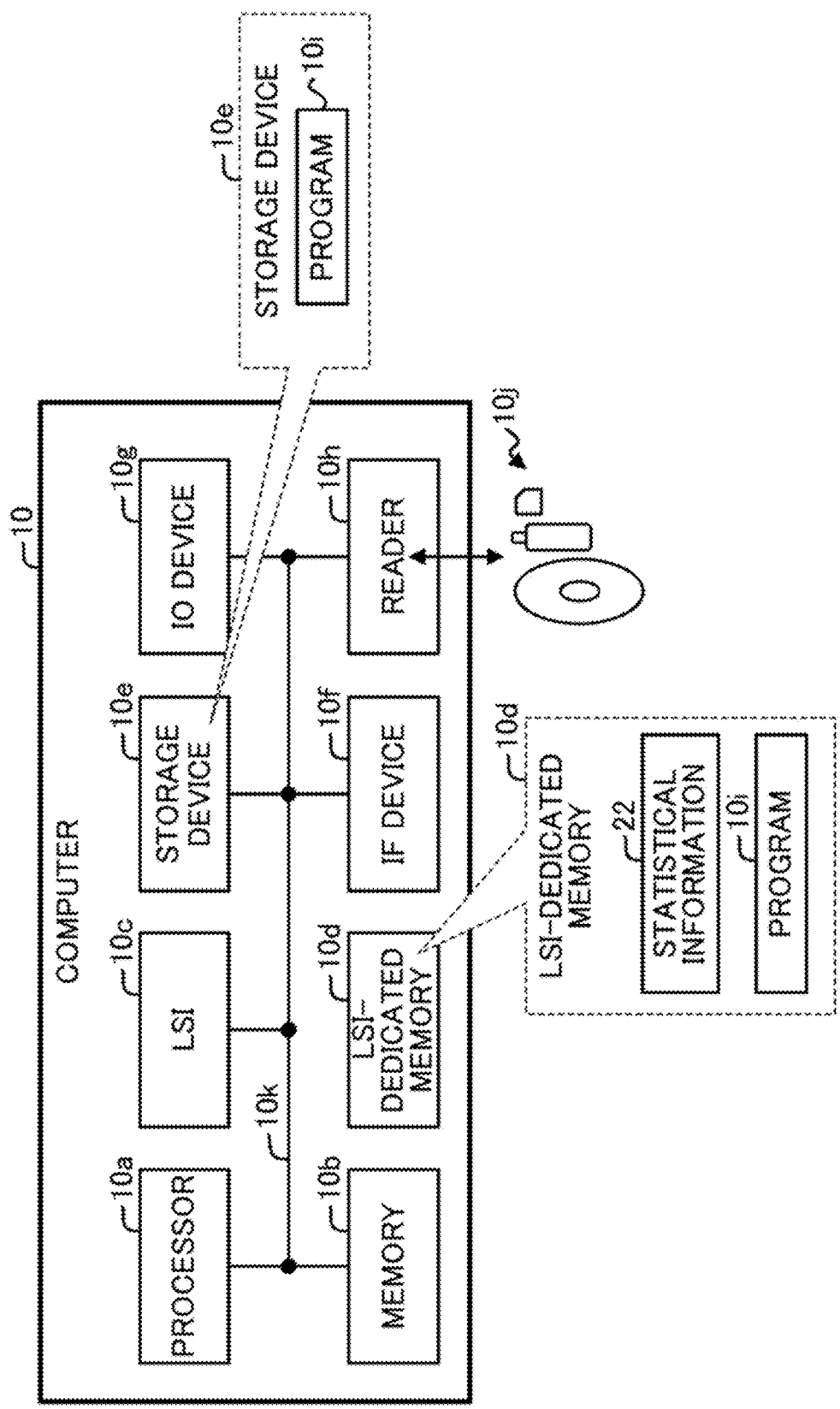
FIG. 27 is a block diagram schematically illustrating an example of the hardware configuration of a computer according to the first and second embodiments.

FIG. 27 is a block diagram schematically illustrating an example of the hardware (HW) configuration of a computer 10. The functions of the learning apparatuses 1 and 1A according to the first and the second embodiments may be achieved by, for example, the HW resources of computer 10 illustrated in FIG. 27. In cases where multiple computers are used as HW resources for achieving the functions of the learning apparatuses 1 and 1A, each of the computers may have the HW configuration illustrated in FIG. 27.

As illustrated in FIG. 27, the computer 10 exemplarily includes a processor 10a, a memory 10b, a LSI 10c, an LSI-dedicated memory 10d, a storage device 10e, an Interface (I/F) device 10f, an Input/Output (I/O) device 10g, and a reader 10h.

The processor 10a is an example of a processor that performs various controls and calculations. The processor 10a may be communicatively coupled to each of the blocks in the computer 10 via the bus 10k. The processor 10a may be a multiprocessor including multiple processors, may be a multicore processor having multiple processor cores, or may have a configuration having multiple multicore processors.

Examples of the processor 10a include an integrated circuit (IC) such as a Central Processing Unit (CPU), an Micro Processing Unit (MPU), an Accelerated Processing Unit (APU), a Digital Signal Processor (DSP), an Application Specific IC (ASIC), and an Field-Programmable Gate Array (FPGA). The processor 10a may be a combination of two or more of the above ICs.

The memory 10b is an example of the HW that stores information such as various data and programs. An example of the memory 10b includes a volatile memory such as Dynamic Random Access Memory (DRAM).

The LSI 10c is an HW device including a processor for dynamically changing the decimal point position of a fixed-point number and for performing a predetermined process in cooperation with the processor 10a. The LSI 10c may operate under control of the processor 10a via the bus 10k. For example, the LSI 10c may include multiple (e.g., a relatively large number) of product-sum calculators and multiple (e.g., a relatively small number) of special calculators.

As an example, the LSI 10c according to the first and the second embodiments may execute processes such as training and inferring of the CNN 20 in response to an instruction (control) from the processor 10a operating as the learning unit 12 and the determiners 14 and 14A.

The LSI 10c may include a control cores (not illustrated). In this case, for example, the processor 10a and the control core may perform a communication process via the bus 10k, and the control core that obtains the control information output from the processor 10a may control the entire LSI 10c.

Examples of the LSI 10c include one or more of Graphics Processing Units (GPUs), one or more FPGAs, and one or more ASICs, or two or more combinations thereof. The above-described operation processing apparatus may be regarded as one including an LSI 10c in addition to the processor 10a. In other words, the processor 10a and the LSI 10c serve as the learning apparatus 1 or 1A as an example of a calculation operation processing apparatus for performing calculations such as training and inferring the CNN 20.

The LSI-dedicated memory 10d may store, for example, control data (control information) directed to the LSI 10c and input/output data used for calculations of the LSI 10c, and may include, for example, a memory such as a DRAM, and a register. The statistical information of the first and the second embodiments may be stored, as the statistical information 22, in the LSI-dedicated memory 10d. Alternatively, the statistical information 22 may be stored in an internal register of the LSI-dedicated memory 10d, for example.

The storage device 10e is an example of the HW that stores information such as various data and programs. Examples of the storage device 10e are various storing devices exemplified by a magnetic disk device such as a Hard Disk Drive (HDD), a semiconductor drive device such as a Solid State Drive (SSD), and a nonvolatile memory. Examples of the nonvolatile memory include a flash memory, a Storage Class Memory (SCM), and a Read Only Memory (ROM).

The storage device 10e may store a program 10i (control program) that implements all or part of various functions of computer 10. The program 10i may include, for example, processes that implements the learning unit 12 and the determiner 14 or 14A. The processor 10a of the learning apparatus 1 or 1A operates as the learning apparatus 1 or 1A by expanding the program 10i stored in the storage device 10e onto the memory 10b or the LSI-dedicated memory 10d and executing each of the processes that program 10i has.

The data storing unit 11, the parameter storing unit 13, and the information storing unit 15 or 15A included in the learning apparatuses 1 and 1A may be achieved by at least part of the storing region of the memory 10b, the LSI-dedicated memory 10d, and the storage device 10e, for example.

The IF device 10f is an example of a communication IF that controls, for example, the connection and the communication with a non-illustrated network such as an internet. For example, the IF device 10f may include adapters compliant with a Local Area Network (LAN), optical communication (e.g., Fibre Channel (PC)), or the like. The adapter may deal with one or both of wireless and wired communication schemes. For example, the program 10i may be downloaded from a non-illustrated network to the computer 10 via the communication IF and stored in the storage device 10e.

The I/O device 10g includes one or both of an input device and an output device. Examples of the input device include a keyboard, a mouse, and a touch panel. Examples of the output device include a monitor, a projector, and a printer.

The reader 10h is an example of a reader that reads data and programs recorded on the recording medium 10j. The reader 10h may include a connecting terminal or device to which the recording medium 10h can be connected or inserted. Examples of the reader 10h include an adapter conforming to, for example, Universal Serial Bus (USB), a drive apparatus that accesses a recording disk, and a card reader that accesses a flash memory such as an SD card. The recording medium 10j may store the program 10i, and the reader 10h may read the program 10i from the recording medium 10j and store the program 10i into in the storage device 10e.

The recording medium 10j is an exemplary non-transitory computer-readable recording medium such as a magnetic/optical disk, and a flash memory. Examples of the magnetic/optical disk include a flexible disk, a Compact Disc (CD), a Digital Versatile Disc (DVD), a Blu-ray disk, and a Holographic Versatile Disc (HVD). An examples of the flash memory includes a semiconductor memory such as a USB memory and an SD card.

The above HW configuration of the computer 10 is a merely example. Accordingly, the computer 10 may appropriately undergo increase or decrease of hardware blocks (e.g., addition or deletion of arbitrary blocks), division, integration in an arbitrary combination, and addition or deletion of the bus. For example, in the learning unit 1 or 1A, at least one of the I/O device 10g and the reader 10h may be omitted.

[4] Miscellaneous

The techniques according to the first and the second embodiments described above can be changed and modified as follows.

For example, the blocks of the learning unit 1 or 1A illustrated in FIG. 1 or FIG. 22 may be merged in any combinations, and may be each divided.

Further, in the offset information illustrated in FIGS. 15 and 23, the setting content such as the threshold range and the offset amount, or the number of entries are not limited to the content exemplified in FIGS. 15 and 23, and other threshold ranges, other offset amounts, and the like may be set.

Further, in the first and the second embodiments, the IWL is assumed to be calculated on the basis of the overflowing rate, but the present invention is not limited to this. Alternatively, the WL may be calculated on the basis of the underflowing rate, for example.

In the first and the second embodiments, as an explanation of a method of changing the correction value to be applied to the decimal point position in accordance with the progress of learning (in other words, the degree of progress of learning), the method of changing the correction value in accordance with a change of the learning rate µ is exemplified, but the method is not limited to this. As another example of the progress of learning, any one or a combination of two or more of the following (A) to (D) may be used.

(A) Calculation Result of the Learning Loss Function:

The loss function is a function for calculating an error between an output of a neural network and correct answer data (label), and is a function that outputs a smaller value as the learning progresses. The determiner 14 or 14A may change the offset according to the calculation result of the learning loss function.

For example, the determiner 14 or 14A may execute the offset setting process at a timing when the loss function comes below any of multiple thresholds. Further, the determiner 14 or 14A may determine the offset on the basis of the offset information in which the multiple thresholds of the loss function are associated with offsets. In this case, the offset information may be set such that the loss function of a larger value increases the offset amount.

(B) Recognition Accuracy:

The recognition accuracy, e.g., the recognition rate, increases as learning proceeds. The determiner 14 or 14A may change the offset according to a change in recognition accuracy.

For example, the determiner 14 or 14A may execute the offset setting process at a timing when the recognition accuracy exceeds any of multiple threshold. Further, the determiner 14 may determine the offset on the basis of the offset information in which the multiple thresholds of the recognition accuracy are associated with offsets. In this case, the offset information may be set such that a smaller recognition accuracy makes the offset amount larger.

(C) Quantization Error:

The quantization error is information calculated by inputting data saturated by the saturating process and data rounded by the rounding process into a predetermined error function. For example, the difference between the calculation result of a real number not having undergone saturating and rounding and the quantization result may be expressed as an error function. The determiner 14 or 14A may change the offset according to a change in quantization error.

For example, the determiner 14 or 14A may execute the offset setting process at a timing when the quantization error comes below any of multiple thresholds. Further, the determiner 14 or 14A may determine the offset on the basis of the offset information in which the multiple thresholds of the quantization error are associated with offsets. In this case, the offset information may be set such that a larger quantization error makes the offset amount larger.

(D) Iteration of Learning:

For example, iterations (iteration number) represents the repeat number of times of learning. The determining unit 14 or 14A may change the offset according to iteration numbers of learning.

For example, the determiner 14 or 14A may execute the offset setting process at a timing when the iteration number exceeds any of multiple thresholds. Further, the determiner 14 may determine the offset on the basis of the offset information in which the multiple thresholds of the iteration number are associated with offsets. In this case, the offset information may be set such that a smaller iteration number makes the offset amount larger.

As described above, the learning apparatus 1 or 1A may perform the offset setting process on the basis of the learning rate p, the offset information, the magnitude of the change in decimal point position (e.g., the difference in IWL), one of the above factors (A) to (D), or a combination of two or more of the above items. Thereby, the same effects as those of the first or second embodiment can be attained.

In one aspect, it is possible to suppress a decrease in accuracy of a learning result of a learning model.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An arithmetic processing apparatus comprising:
a memory; and
a processor coupled to the memory, the processor being configured to:
calculate, when a training of a given learning model is repeatedly performed, a decimal point position of fixed-point number data used in the training based on statistical information related to a distribution of positions of most significant bits or positions of least significant bits of each of a plurality of fixed-point number data obtained each time the training is repeated;
determine, when the training of the given learning model is repeatedly performed, an offset amount for correcting the decimal point position of the fixed-point number data used in the training in accordance with a degree of progress of the training; and
determine, based on the offset amount, the decimal point position of the fixed-point number data used in the training.

2. The arithmetic processing apparatus according to claim 1, wherein the processor is further configured to apply the offset amount to the determined decimal point position.

3. The arithmetic processing apparatus according to claim 1, wherein
the memory stores offset information in which the degree of the progress of the training is associated with the offset amount; and
the processor is further configured to determine, when a change in the degree of the progress of the training is detected, the offset amount based on the offset information.

4. The arithmetic processing apparatus according to claim 1, wherein the processor is further configured to:
detect an amount of fluctuation of the decimal point position of the fixed-point number data used in the training while the training of the learning model is repeated a given number of times; and determine the offset amount based on the number of times of the detection of each of a plurality of the amounts of fluctuation while the training is repeated the given number of times.

5. The arithmetic processing apparatus according to claim 4, wherein:
the memory stores offset information in which a threshold of a number of times of the detection of each of a plurality of the amounts of fluctuation is associated with an offset amount, wherein
the processor is further configured to determine the offset amount based on the offset information.

6. The arithmetic processing apparatus according to claim 4, wherein the processor is further configured to:
detect, when a change in the degree of the progress of the training is detected, the amount of fluctuation while the training is repeated the given number of times; and
keep the offset amount based on the number of times of the detection until a change in the degree of the progress of the training is detected next.

7. The arithmetic processing apparatus according to claim 1, wherein the degree of progress of the learning is one or more of a learning rate, a loss function of the training, a recognition accuracy of the learning model, a quantization error of the training, and the number of iterations of the training.

8. The arithmetic processing apparatus according to claim 1, wherein:
the learning model is a neural network; and
the processor is further configured to determine the decimal point position of a fixed-point number data used in calculation of each of a plurality of layers included in the neural network.

9. A non-transitory computer-readable recording medium having stored therein a control program causing a computer to execute a process comprising:
calculating, when a training of a given learning model is repeatedly performed, a decimal point position of fixed-point number data used in the training based on statistical information related to a distribution of positions of most significant bits or positions of least significant bits of each of a plurality of fixed-point number data obtained each time the training is repeated;
determining, when the training of the given learning model is repeatedly performed, an offset amount for correcting the decimal point position of the fixed-point number data used in the training in accordance with a degree of progress of the training; and
determining, based on the offset amount, the decimal point position of the fixed-point number data used in the training.

10. The non-transitory computer-readable recording medium according to claim 9, wherein the process further comprises applying the offset amount to the determined decimal point position.

11. The non-transitory computer-readable recording medium according to claim 9, wherein the process further comprises:
when detecting a change in the degree of the progress of the training,
determining the offset amount based on offset information in which the degree of the progress of the training is associated with the offset amount and which is stored in a memory.

12. The non-transitory computer-readable recording medium according to claim 9, wherein the process further comprises:
detecting an amount of fluctuation of the decimal point position of the fixed-point number data used in the training while the training of the learning model is repeated a given number of times; and
determining the offset amount based on the number of times of the detection of each of a plurality of the amounts of fluctuation while the training is repeated the given number of times.

13. The non-transitory computer-readable recording medium according to claim 12, wherein the process further comprises determining, offset information in which a threshold of a number of times of the detection of each of a plurality of the amounts of fluctuation is associated with an offset amount and which is stored in a memory, the offset amount based on the offset information.

14. The non-transitory computer-readable recording medium according to claim 12, wherein the process further comprises:
detecting, when detecting a change in the degree of the progress of the training, the amount of fluctuation while the training is repeated the given number of times; and
keeping the offset amount based on the number of times of the detection until a change in the degree of the progress of the training is detected next.

15. The non-transitory computer-readable recording medium according to claim 9, wherein the degree of progress of the learning is one or more of a learning rate, a loss function of the training, a recognition accuracy of the learning model, a quantization error of the training, and the number of iterations of the training.

16. The non-transitory computer-readable recording medium according to claim 9, wherein:
the learning model is a neural network; and
the process further comprising determining the decimal point position of a fixed-point number data used in calculation of each of a plurality of layers included in the neural network.

17. A control method that causes the computer to execute a process comprising:
calculating, when a training of a given learning model is repeatedly performed, a decimal point position of fixed-point number data used in the training based on statistical information related to a distribution of positions of most significant bits or positions of least significant bits of each of a plurality of fixed-point number data obtained each time the training is repeated;
determining, when the training of the given learning model is repeatedly performed, an offset amount for correcting the decimal point position of the fixed-point number data used in the training in accordance with a degree of progress of the training; and
determining, based on the offset amount, the decimal point position of the fixed-point number data used in the training.

18. The control method according to claim 17, wherein the process further comprises applying the offset amount to the determined decimal point position.

19. The control method according to claim 17, wherein the process further comprises:
when detecting a change in the degree of the progress of the training, determining the offset amount based on offset information in which the degree of the progress of the training is associated with the offset amount and which is stored in a memory.

20. The control method according to claim 17, wherein the process further comprises:

detecting an amount of fluctuation of the decimal point position of the fixed-point number data used in the training while the training of the learning model is repeated a given number of times; and determining the offset amount based on the number of times of the detection of each of a plurality of the amounts of fluctuation while the training is repeated the given number of times.

\* \* \* \* \*